(12) United States Patent  
Li

(10) Patent No.: US 6,636,651 B2  
(45) Date of Patent: Oct. 21, 2003

(54) FOUR-PORT BIDIRECTIONAL OPTICAL CIRCULATOR

(75) Inventor: Jim W. Li, Fremont, CA (US)

(73) Assignee: Koncent Communication, Inc., Fujian (CN)

( * ) Notice: Subject to any disclaimer, the term of this patent is extended or adjusted under 35 U.S.C. 154(b) by 58 days.

(21) Appl. No.: 09/877,736

(22) Filed: Jun. 8, 2001

(65) Prior Publication Data

US 2002/0186914 A1 Dec. 12, 2002

(51) Int. Cl.[7] .............................. G02B 6/27; G02B 6/26
(52) U.S. Cl. ........................................... 385/11; 385/15
(58) Field of Search ................. 385/15, 24, 11

(56) References Cited

U.S. PATENT DOCUMENTS

| | | | |
|---|---|---|---|
| 5,381,250 A | | 1/1995 | Meadows .................... 349/196 |
| 5,471,340 A | | 11/1995 | Cheng et al. ................ 359/281 |
| 5,872,878 A | * | 2/1999 | Bergmann .................. 359/483 |
| 5,909,310 A | * | 6/1999 | Li et al. ...................... 359/484 |
| 5,923,472 A | * | 7/1999 | Bergmann .................. 359/618 |
| 6,014,475 A | * | 1/2000 | Frisken ........................ 385/11 |
| 6,178,044 B1 | * | 1/2001 | Li et al. ...................... 359/484 |
| 6,285,499 B1 | * | 9/2001 | Xie et al. .................... 359/484 |
| 6,307,658 B1 | * | 10/2001 | Chiaroni et al. ............ 359/140 |
| 6,310,989 B1 | * | 10/2001 | Liu .............................. 359/496 |
| 6,317,539 B1 | * | 11/2001 | Loh et al. ..................... 385/37 |
| 6,339,661 B1 | * | 1/2002 | Kokkelink et al. ........... 385/11 |
| 6,404,549 B1 | * | 6/2002 | Huang et al. ................ 359/281 |
| 6,438,278 B1 | * | 8/2002 | Liu et al. ..................... 385/11 |
| 2001/0051019 A1 | * | 12/2001 | Bailey et al. .................. 385/37 |
| 2002/0024730 A1 | * | 2/2002 | Ducellier et al. ............ 359/498 |
| 2002/0063929 A1 | * | 5/2002 | Huber ........................ 359/154 |
| 2002/0071181 A1 | * | 6/2002 | Frisken ...................... 359/484 |
| 2002/0110314 A1 | * | 8/2002 | Connolly .................... 385/24 |
| 2002/0168128 A1 | * | 11/2002 | Chang et al. ................ 385/11 |

FOREIGN PATENT DOCUMENTS

WO            9910261         3/1999     ............ G02B/5/30

OTHER PUBLICATIONS

T. Ducellier, K. Tai, B. Chang, J. Xie, J. Chen, L Mao, H. Mao, J. Wheeldon, "The Bidirectional Circulator: an Enabling Technology for Wavelength Interleaved Bidirectional Networks", No Journal Name or date.

* cited by examiner

Primary Examiner—John D. Lee
Assistant Examiner—Daniel Valencia
(74) Attorney, Agent, or Firm—JDI Patent; Joshua D. Isenberg

(57) ABSTRACT

Four-port optical circulators and apparatus employing such optical circulators are disclosed. The circulators utilize various arrangements of birefringent elements, polarization rotators and non-reciprocal polarization rotators to route optical signals from a first input/output (I/O) port to a second I/O port, from the second I/O port to a third I/O port, from the third I/O port to a fourth, and from the fourth I/O port to the first I/O port. The number of components and their configuration may be varied depending upon requirements of optical isolation, port configuration, manufacturability, yield and cost. Four-port circulators may be incorporated into an apparatus with optical signal conditioners, such as chirped fiber gratings, wavelength converters or optical amplifiers, optically coupled to one or more of the input/output ports. Alternatively, the circulators may be incorporated into a bidirectional add/drop apparatus with bandpass filters coupled to two of the input/output ports.

29 Claims, 17 Drawing Sheets

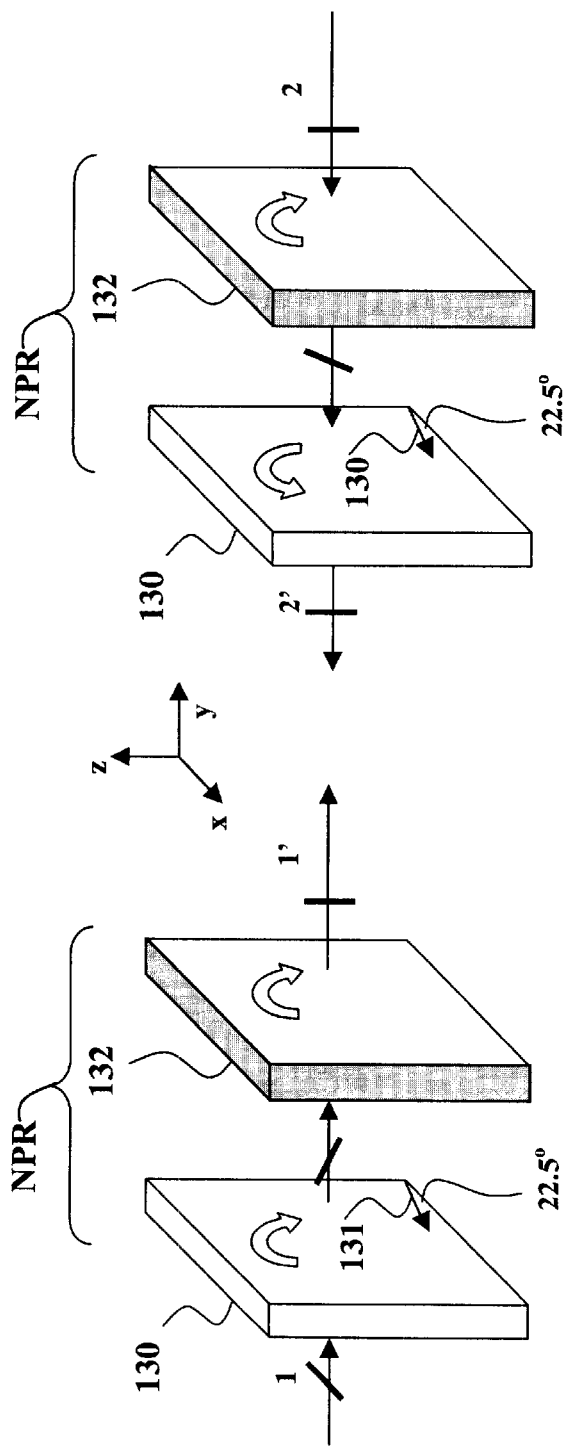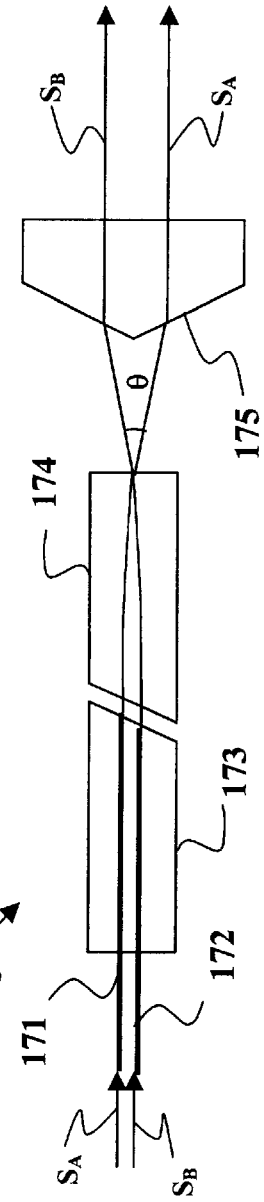

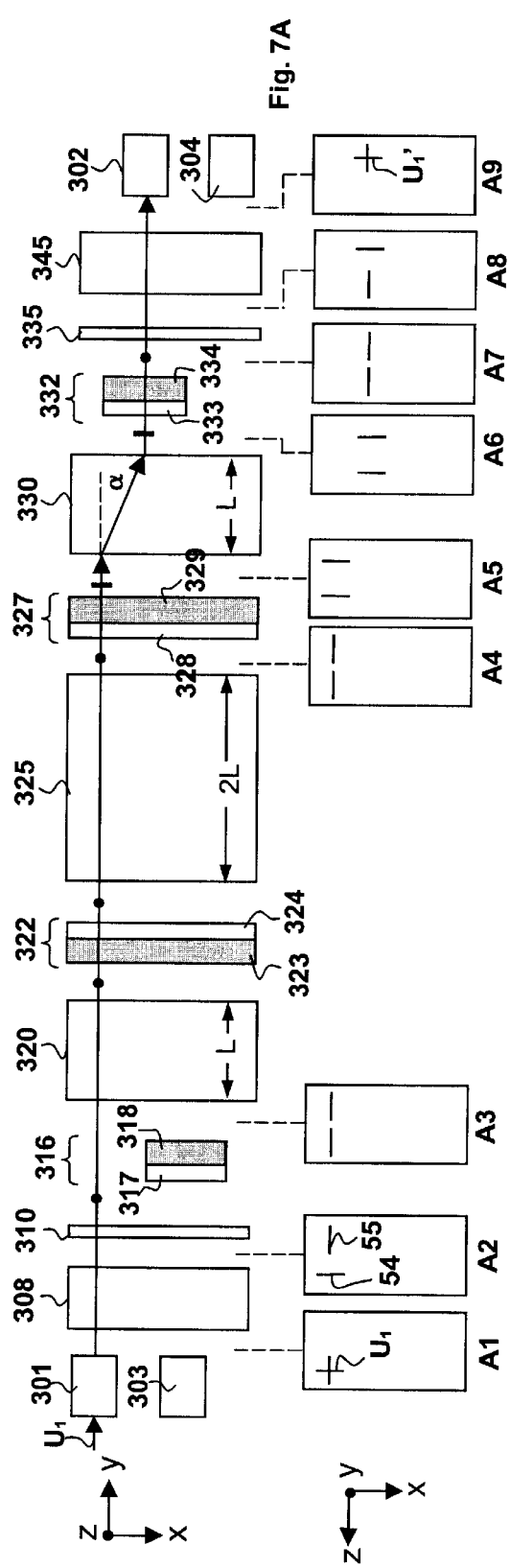
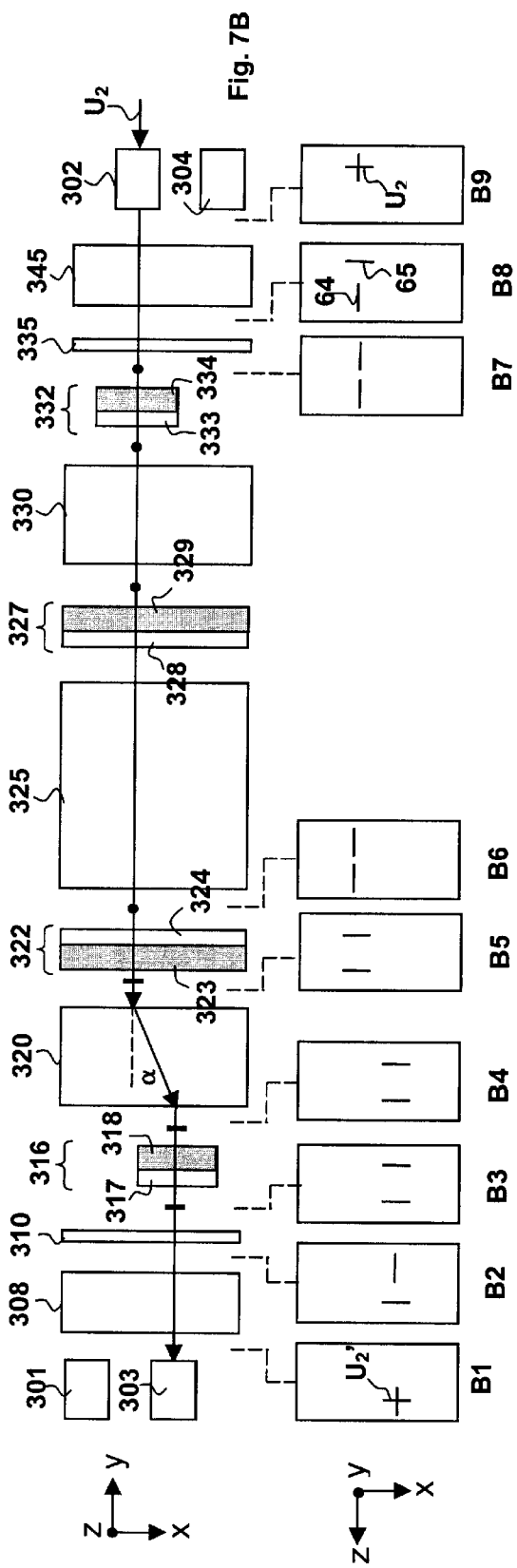
Fig. 7A
Fig. 7B

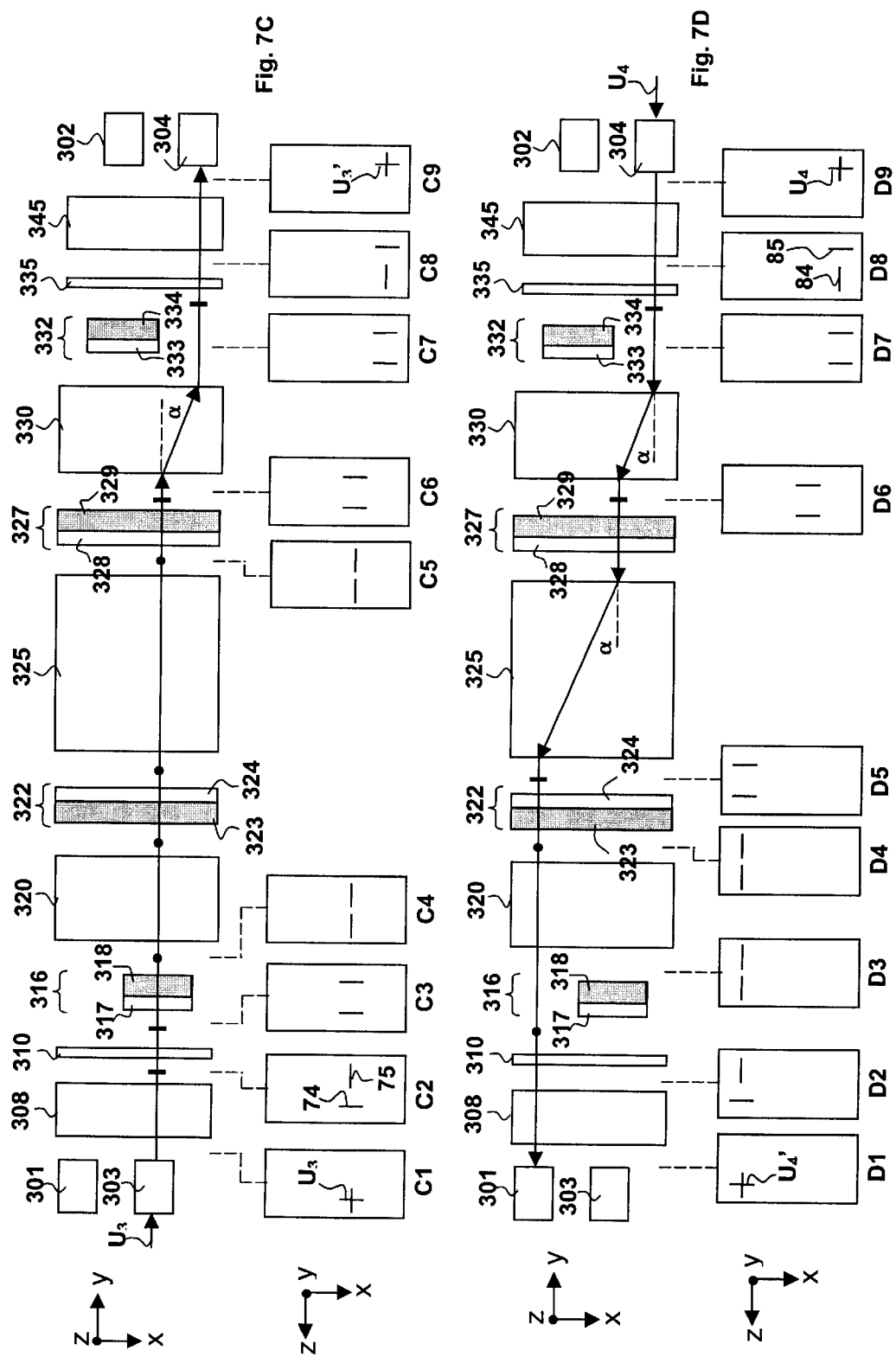

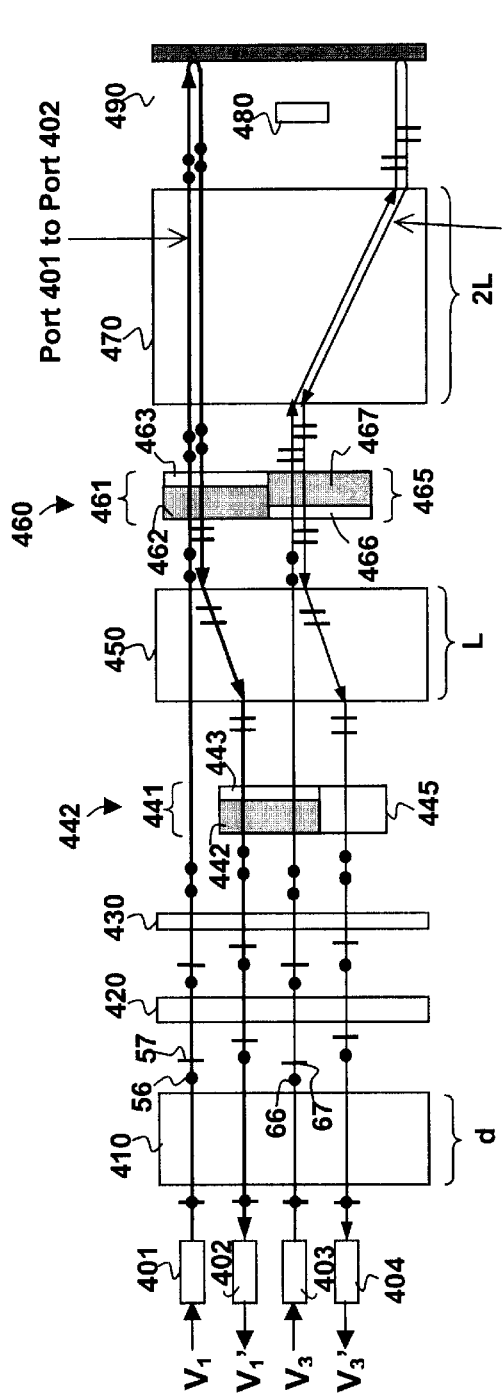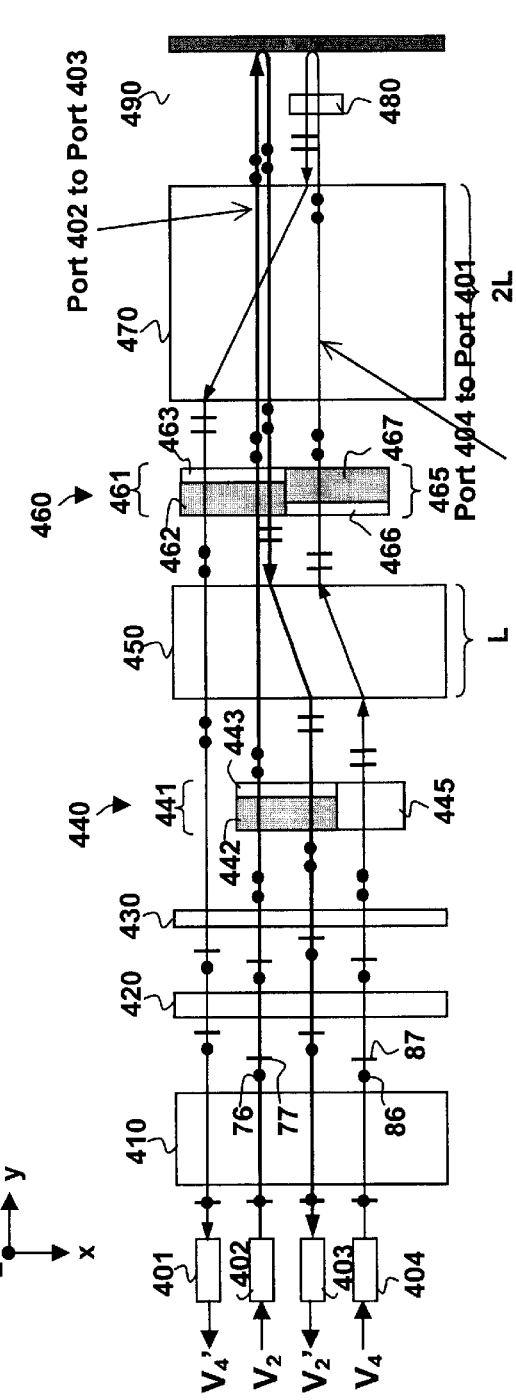

FOUR-PORT BIDIRECTIONAL OPTICAL CIRCULATOR

FIELD OF THE INVENTION

This invention generally relates to optical communication systems. More specifically, this invention relates to four-port bi-directional optical circulators.

BACKGROUND OF THE INVENTION

In fiber optical networks, information transport between terminals is typically carried out by one fiber cable in one direction and another fiber cable in the reverse direction. FIG. 1A shows the information exchange between terminal A and terminal B where tightly packed channel signals $\lambda_1$, $\lambda_2$, $\lambda_3$, $\lambda_4$, . . . are transmitted from A to B through cable 1, and from B to A through cable 2. Information may also be transmitted bi-directionally, as shown in FIG. 1B. In this case, cable 1 transmits the odd-channel signals $\lambda_1$, $\lambda_3$, $\lambda_5$, . . . from A to B. Cable 2 transmits the even-channel signals $\lambda_2$, $\lambda_4$, $\lambda_6$, . . . from B to A. Bi-directional transmission is desirable because (1) for a given channel spacing, only half the fiber cables are needed; (2) for a given channel count, the channel spacing in bidirectional transmission is doubled (i.e., $\Delta\lambda'=2\Delta\lambda$). Consequently the cross talk or interference between channels is significantly reduced.

Therefore there is a great demand for both active and passive optical components suitable for bi-directional networks, such as bidirectional dispersion compensator, bi-directional gain equalizer, bi-directional add/drop module, etc. Bi-directional circulator is the key element for construction of the above-mentioned bidirectional components. It provides circulation of optical signals from port 1 to port 2, from port 2 to port 3, from port 3 to port 4, and from port 4 to port 1.

One prior art bi-directional circulator is described in U.S. Pat. No. 5,689,593. This circulator utilizes a polarization beam splitter to either transmit or reflect beams to different output ports according to the polarity of the beams. For a conventional broadband polarization beam splitter, the principal transmittance of the p-polarized components (polarization in the plane of incidence) is typically $\geq 95\%$, and the principal reflectance of the s-polarized beam (polarization perpendicular to the plane of incidence) is typically $\geq 99\%$. The residual reflected portion of the p-component ($\leq 5\%$) and the residual transmitted portion of the s-component ($\leq 1\%$) will end up coupling into the wrong input/output ports. The residual reflection also exists in an improved beam splitter made with two birefringent crystal prisms, as suggested in the U.S. Pat. No. 5,689,593. Therefore, this circulator suffers from cross-talk among 4 ports. In addition, the circulator is bulky since the adjacent ports are perpendicular with each other.

It is therefore the objective of this invention to provide a compact, economical bi-directional circulator with very low cross-talk, very high extinction ratio, and very high isolation.

SUMMARY OF THE INVENTION

Embodiments of the present invention are directed to a 4-port optical circulators and apparatus employing 4-port optical circulators. The circulators route optical signals from a first input/output (I/O) port to a second I/O port, from the second I/O port to a third I/O port, from the third I/O port to a fourth, and from the fourth I/O port to the first I/O port.

In accordance with an embodiment of the present invention, a 4-port optical circulator may comprise first and second birefringent elements with a first polarization rotator optically coupled therebetween. A non-reciprocal polarization rotator is optically coupled to the second birefringent element, so that the second birefringent element is disposed between the first polarization rotator and the non-reciprocal polarization rotator. The circulator may further include a third birefringent element optically coupled to the non-reciprocal polarization rotator; a second polarization rotator optically coupled to the third birefringent element, the second polarization rotator having first and second half-waveplate sections and first and second optical path compensation sections; and a fourth birefringent element optically coupled to the second polarization rotator. The circulator may also include first, second, third and fourth optical input/output ports. The first and third ports may be optically coupled to the first birefringent element and the second and fourth ports may be optically coupled to the fourth birefringent element.

In accordance with an embodiment of the present invention, a four-port optical circulator may include first, second, third, and fourth input/output (I/O) ports; a first, second and third, birefringent elements; at least a first polarization rotator optically coupled between the first and second birefringent elements, and at least a first, second, and third non-reciprocal polarization rotator. The first polarization rotator has one or more reciprocal polarization rotation sections and one or more optical path compensation sections. The first non-reciprocal polarization rotator is disposed between the first polarization rotator and the second birefringent element. The second birefringent element is disposed between the non-reciprocal polarization rotator and the second non-reciprocal polarization rotator. The second non-reciprocal polarization rotator is disposed between the second and third birefringent elements. The third birefringent element is disposed between the second and third non-reciprocal polarization rotators. The birefringent elements, polarization rotators and non-reciprocal polarization rotator co-operate to route optical signals from the first port to the second port, from the second port to the third port, from the third port to the fourth port and from the fourth port to the first port.

Embodiments of the 4-port circulator provide for bidirectional optical circulation with high extinction ratio and much lower cross-talk between ports than previous designs (prior art). Furthermore, the alignment of the components is simple and the cost of construction may be reduced compared to prior circulator designs.

In accordance with another aspect of this invention, a 4-port optical circulator such as those described above may be incorporated into an apparatus with an optical signal conditioner, such as a chirped fiber grating, or wavelength converter, or optical amplifier, optically coupled to one or more of the input output ports. The chirped fiber gratings may be used to achieve bidirectional dispersion compensation. Wavelength converters may be used for wavelength switching and relocation in multi-wavelength systems.

In accordance with another aspect of this invention, a 4-port optical circulator of such as those described above may be incorporated into a bi-directional optical add/drop apparatus. Such an apparatus may include a first bidirectional circulator having first, second, third, and fourth input/output (I/O) ports. A first bandpass filter may be optically coupled to the second I/O port. A second bandpass filter optically coupled to the fourth I/O port.

BRIEF DESCRIPTION OF THE DRAWINGS

FIGS. 2B–2C are isometric diagrams that illustrate the operation of a non-reciprocal polarization rotator used in the optical circulator of FIG. 2A;

FIG. 2D depicts a schematic diagram that illustrates a dual fiber collimator that may be used in the optical circulator of FIG. 2A;

FIGS. 7A–7D depict cross-sectional schematic diagrams of optical signals at different locations within the optical circulator of FIG. 6;

FIGS. 10A–10B depict depicts cross-sectional schematic diagrams of optical signals at different locations within the optical circulator of FIG. 9;

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
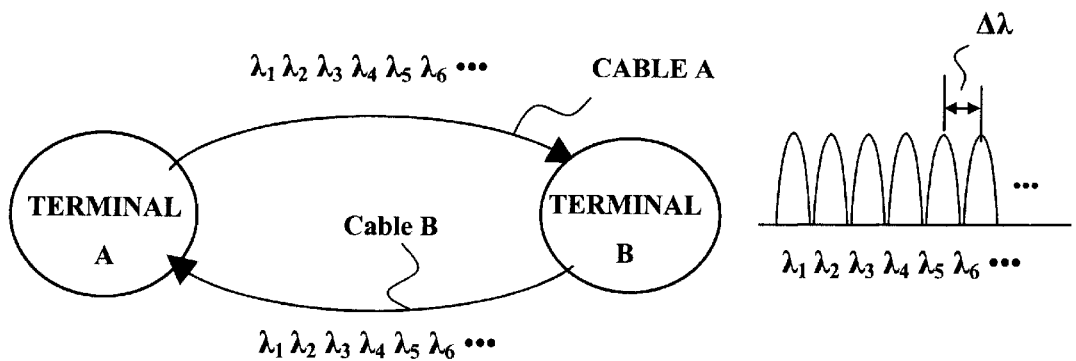
FIG. 1A depicts a uni-directional fiber optic communications network according to the prior art.
Figure 1B:
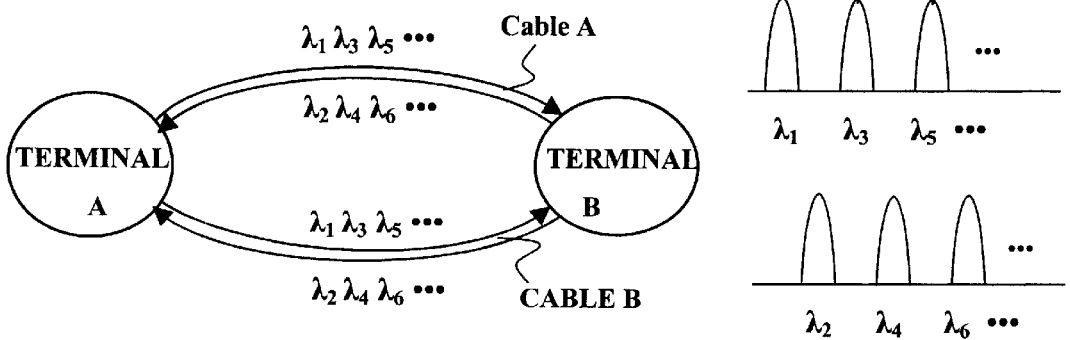
FIG. 1B depicts a bi-directional fiber optic communications network according to the prior art
Figure 2A:
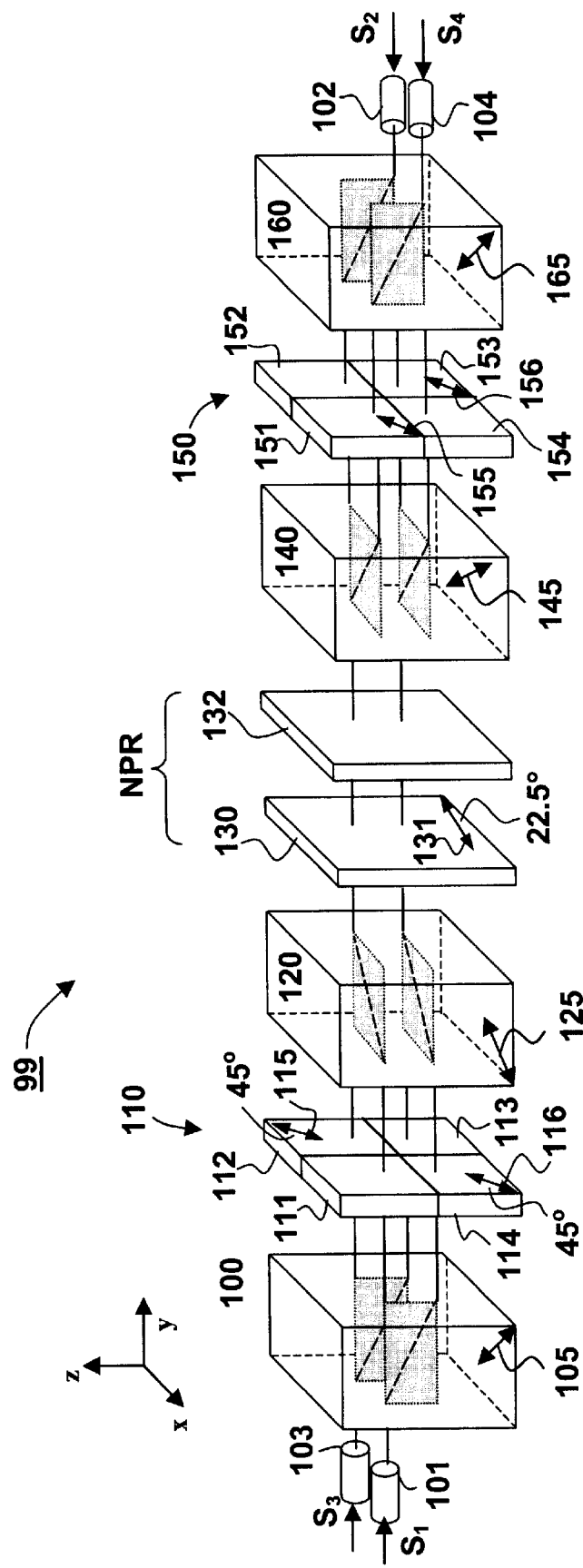
FIG. 2A depicts an isometric schematic of an optical circulator according to a first embodiment of the invention.

FIG. 2A illustrates a four-port optical circulator 99 according to a first embodiment of the present invention. The circulator 99 provides for bi-directional optical circulation in a compact design that uses fewer components than previous designs. Furthermore, the alignment of the components in the circulator 99 is simple and the cost of construction may be reduced compared to prior circulator designs. The circulator 99 generally comprises first, second, third and fourth birefringent elements 100, 120, 140, 160, first and second polarization rotators 110, 150, and a non-reciprocal polarization rotator NPR. These elements are typically laid out in the order depicted in FIG. 2A with the first polarization rotator 110 optically coupled to and disposed between the first and second birefringent elements 100, 120 and the second birefringent element 120 optically coupled to and disposed between the first polarization rotator 110 and the non-reciprocal polarization rotator NPR.

The birefringent elements 100, 120, 140, 160 may be made of any suitable birefringent material such as calcite, rutile, yttrium orthovanadate ($YVO_4$) and the like. Birefringent elements 100, 120, 140, 160 are characterized by optic axes 105, 125, 145, 165 respectively. An angle between the polarization of incident radiation and a given optic axis determines the index of refraction for the radiation within the corresponding birefringent element. Typically, radiation polarized parallel to a plane containing the optic axis of a birefringent element and the propagation wave vector is considered an extraordinary ray and radiation polarized perpendicular to the plane containing the optic axis and the propagation wave vector is considered an ordinary ray. By way of example, in the embodiment shown in FIG. 2A the optic axes 105, 165 are substantially parallel to each other and lie within planes that are substantially orthogonal to the planes containing the optic axes 125, 145. More specifically, optical axes 105, 165 lie within planes that are substantially parallel to the y-z plane and optic axes 125, 145 lie within planes that are substantially parallel to the x-y plane.

In the embodiment depicted in FIG. 2A, the polarization rotators 110, 150 are each divided into four segments 111, 112, 113, 114 and 151, 152, 153, 154 respectively. By way of example, segments 112,114 of rotator 110 and segments 151, 153 of rotator 150 reciprocally rotate the polarization of radiation incident upon them by 90°. As used herein, reciprocal rotation refers to the situation whereby optical signals traveling along a forward path through a rotating segment are rotated by a certain amount in one sense (e.g., counterclockwise) of rotation and signals traveling along a reverse path through the rotating segment are rotated by the same amount but in the opposite sense of rotation (e.g., clockwise). In other words, the original polarization state of the launching beam is restored when the beam travels in the reverse path. Rotating segments 112, 114, 151, 153 may include reciprocal rotators, such as half waveplates characterized by optic axes 115, 116, 155, 156 respectively. Other types of reciprocal rotators include liquid crystals, and optically active crystals such as Quartz, $TeO_2$, Te, Se, and $AgGaS_2$. Segments 111, 113 of rotator 110 and segments 152, 154 of rotator 150 do not rotate the polarization of radiation incident upon them. To ensure phase matching to eliminate polarization mode dispersion, it is often desirable that the rotating segments 112, 114, 151, 153 and the non-rotating segments 111, 113, 152, 154 have the same optical thickness, e.g. the same product of thickness and the index of refraction.

The non-reciprocal polarization rotator NPR may be any type of device for non-reciprocally rotating the polarization of radiation traveling through it. As used herein, non-reciprocal polarization rotation refers to the situation in which the amounts of polarization rotation along forward and reverse paths through a polarization rotator are not necessarily equal and opposite. In other words, the original polarization state of the launching beam is not restored when the beam travels in the reverse path. Faraday rotator is a typical non-reciprocal polarization rotator. In the exemplary embodiment shown, the non-reciprocal polarization rotator NPR rotates by a net 90° the polarization of all components of radiation incident upon it from the second birefringent element 120 but rotates the polarization of radiation incident from the third birefringent element 140 by a net 0°. By way of example, and without loss of generality, the non-reciprocal rotator NPR may comprise a half waveplate 130 optically coupled to a Faraday rotator 132.

The operation of the non-reciprocal polarization rotator NPR is depicted in FIGS. 2B–2C. In FIG. 2B an optical signal 1 traveling along a forward path substantially parallel to the x-axis is incident on the half waveplate 130. The half-wave plate 130 has an optical axis 131 oriented at 22.5° clockwise with respect to the x-axis. Thus, on the forward path shown in FIG. 2B, the half-wave plate 130 rotates the polarization of beam 1 clockwise by 45° when viewed into the optical signal 1, i.e., to the left in FIG. 2B. On the forward path, shown in FIG. 2B, the Faraday rotator 132 subsequently rotates the polarization of the optical signal 1 clockwise by an additional 45°. The net result of the half-wave plate 130 and the Faraday rotator 132 is to rotate the polarization of beam 1 clockwise by 90° to form beam 1'. On a reverse path, shown in FIG. 2C, an optical signal 2 travels substantially anti-parallel to the x-axis. The optical signal 2 first encounters the Faraday rotator 132. The Faraday rotator 132 rotates the polarization of the optical signal 2 clockwise by 45° when viewed along the optical signal 2, i.e., towards the left in FIG. 2C. The half-wave plate 130, being a reciprocal rotator, rotates optical signal 2 counter-clockwise by 45° when viewed along beam 2, i.e., towards the left in FIG. 2C. The net result of Faraday rotator 132 and the half-wave plate 130 is to keep the polarization of optical signal 2 unchanged and thereby form optical signal 2'.

Alternatively, the relative positions of the half-wave plate 130 and faraday rotator 132 may be reversed in the non-reciprocal polarization rotator NPR. In such a case, however, it is desirable to orient the optical axis 131 of the waveplate 130 at 67.5° with respect to the x-axis to ensure non-reciprocal rotation similar to that described with respect to FIGS. 2B–2C Referring back to FIG. 2A, first and third input/output ports 101, 103 may be optically coupled to the first birefringent element 110 and second and fourth input/output ports 102, 104 may be optically coupled to the fourth birefringent element 160. The birefringent elements 100, 120, 140, 160, polarization rotators 110, 150, and non-reciprocal polarization rotator NPR are configured such that circulator 99 operates as a 4-port, bi-directional optical circulator. Specifically, optical signals $S_1$ directed towards the circulator 99 that are incident on I/O port 101 are routed by the circulator 99 to I/O port 102. Optical signals $S_2$ directed towards the circulator 99 that are incident on I/O port 102 are routed by the circulator 99 to I/O port 103. Optical signals $S_3$ directed towards the circulator 99 that are incident on I/O port 103 are routed by the circulator 99 to I/O port 104. Optical signals $S_4$ directed towards the circulator 99 that are incident on I/O port 104 are routed by the circulator 99 to I/O port 101. The I/O ports 101, 102, 103, 104 may each include a collimating lens, such as a graded refractive index (GRIN) lens, ball lens, or micro lens to couple optical signals between the circulator 99 and one or more optical fibers (not shown).

The I/O ports 101, 102, 103, 104 may include dual fiber collimators that couple pairs of optical fibers to the circulator 99. An example of a dual fiber collimator 170 is depicted in FIG. The dual fiber collimator 170 may include a ferrule 173, a collimating lens 174 such as GRIN lens, and a wedge 175. The ferrule 173 receives two optical fibers 171, 172. A small gap may separate the ferrule 173 from the collimating lens 174. In such a case, the ends of the ferrule 173 and collimating lens 174 that face the gap may be polished at an angle, e.g. 8°, to reduce the likelihood that unwanted reflections will couple back to the fibers 171, 172 or to the collimating lens 174. Optical signals $S_A$, $S_B$ couple from the fibers 171, 172 to the collimating lens 174, which deflects them such that they diverge at an angle θ. The wedge 175 refracts the signals so that they are parallel to each other. By reversing the direction of signals $S_A$, $S_B$, the dual fiber collimator 170 may couple the signals from the circulator 99 to the fibers 171, 172. By way of example I/O ports 101, 103 may include a dual fiber collimator of the type shown in FIG. 2D to accommodate fibers carrying signals $S_1$, $S_3$. to the circulator 99 or to accommodate carrying signals $S_2$, $S_4$ from the circulator 99. Alternatively, a Wollaston prism can be used to replace wedge 175 to bend beams $S_A$, $S_B$.

The method of operation of the 4-port circulator can be understood by referring simultaneously to FIG. 2A where component layout is shown, and FIGS. 3A–3D where polarization diagrams at the output of each component are shown when one looks into the y-axis. By way of example, one or more un-polarized WDM signals $S_1$ may enter the first birefringent element 100 from the first input/output port 101. The un-polarized signal $S_1$ may include both vertical and horizontal components as shown in cross section A1 of FIG. 3A. The first birefringent element 100 divides signal $S_1$ into a horizontally polarized ordinary beam 50 and a vertically polarized extraordinary beam 51, as shown in cross section A2 of FIG. 3A. The first polarization rotator 110 is optically coupled between the first and second birefringent elements 110, 120. By way of example, the first polarization rotator 100 may include first and second half-wave plate sections 112, 114, and first and second optical path compensator sections 111, 113 which compensate for the optical path in the half-wave plate section 112, 114. The second half-wave plate section 114 rotates the polarization of beam 51 by 90° so that beams 50, 51 are both polarized horizontally as shown in cross section A3 of FIG. 3A. The optic axis 125 of the second birefringent element 120 is oriented such that beams 50, 51 refract towards the –x direction. Consequently beams 50, 51 are displaced when they exit the second birefringent element 120, as shown in cross section A4 of FIG. 3A.

The non-reciprocal polarization rotator NPR is optically coupled between the second birefringent element 120 and the third birefringent element 140. The non-reciprocal polarization rotator NPR rotates the linear polarization of beams propagating in y-direction by 90° but does not change the polarization of beams propagating in the reverse direction (i.e., –y direction) as described above. As described above, the non-reciprocal polarization rotator NPR may include a half-wave plate 130 optically coupled to a Faraday rotator 132. The first half-wave plate 130 is aligned with its optical axis 131 at 22.5° with respect to x-axis so that it rotates the horizontally polarized beams 50, 51 clockwise by 45° as shown in cross section A5 of FIG. 2A. The Faraday rotator 132 further rotates beams 50, 51 clockwise by 45°, so the net effect of NPR is a conversion of beams 50, 51 from horizontal polarization into vertical polarization, as shown in cross section A6 of FIG. 3A. Since for the third birefringent element 140, beams 50, 51 from NPR are ordinary beams, they pass through the third birefringent element 140 without refraction, as shown in cross section A7 of FIG. 3A. The second polarization rotator 150 is optically coupled between the third and the fourth birefringent elements 140, 160. The second polarization rotator 150 includes a third and a fourth half-wave plate section 151, 153, and a third and a fourth optical path compensator sections 152, 154 which tend to compensate for the optical path in the half-wave plate sections 151, 153. The second polarization rotator 150 rotates beam 51 by 90° so that beams 50 and 51 are complementary polarized, as shown in cross section A8 of FIG. 3A The fourth birefringent element 160 combines beams 50 and 51 to form an output signal $S_1$ at a second input/output port 102, as shown in cross section A9 of FIG. 3A. The fourth birefringent element 160 has its optical axis aligned substantially parallel to the optical axis of the first birefringent element 110, so that the optical path differences induced inside the first and fourth birefringent elements 100, 160 tend to cancel.

Figure 3A:
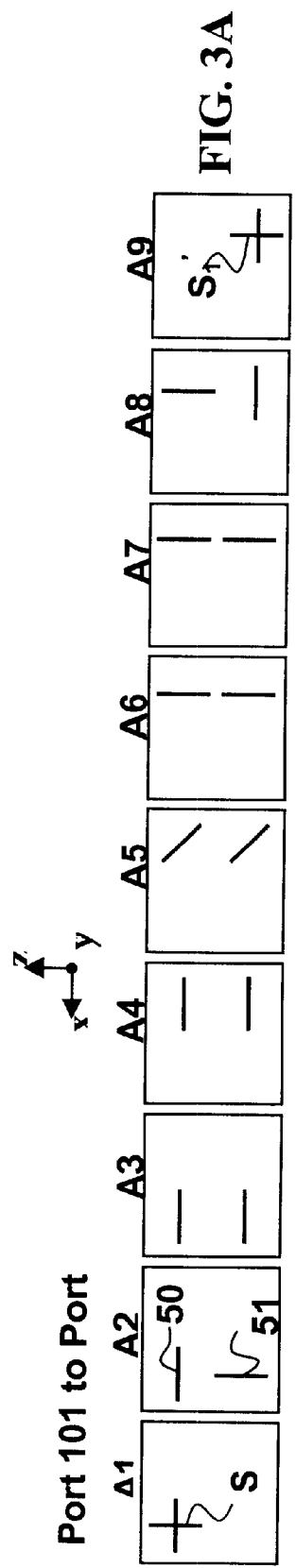
FIGS. 3A–3D depict cross-sectional schematic diagrams of optical signals at different locations within the optical circulator of FIG. 2.
Figure 3B:
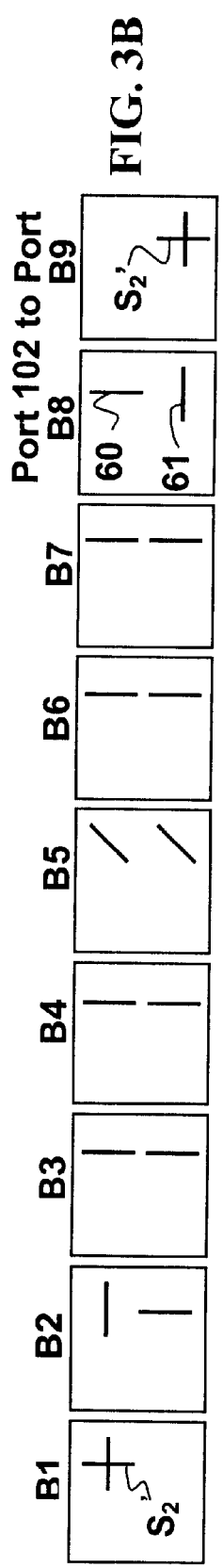

For WDM signals $S_2$ entering the second input/output port 102, the fourth birefringent element 160 divides the signals into complementary polarized components 60, 61 as shown in cross section B8 of FIG. 3B. The half-wave plate section 153 in the second polarization rotator 150 rotates beam 61 by 90° while the compensator section 152 compensates for the optical path that beam 61 travels through section 153. As a result, beams 60, 61 are phase-matched and are both vertically polarized, as shown in cross section B7 of FIG. 3B. Since for the third birefringent element 140, beams 60, 61 are ordinary beams, they pass through 140 without diffraction, as shown in cross section B6 of FIG. 3B. Faraday rotator 132 rotates beams 60, 61 clockwise by 45°, as shown in cross section B5 of FIG. 3B. The first half-wave plate 130 rotates beams 60, 61 counter-clockwise by 45° as shown in cross section B4 of FIG. 3B. Consequently, beams 60, 61 pass through non-reciprocal polarization rotator NPR without altering their original polarization states. The second birefringent element 120 does not diffract beams 60, 61 because they are vertically polarized as shown in cross section B3 of FIG. 3B. The half-wave plate section 112 in the first polarization rotator 110 rotates beam 60 by 90°, as shown in cross section B2, while the compensation section 113 compensates for the optical path that beam 60 passes through section 112. The first birefringent element then combines beams 60 and 61 to form an output beam $S_2'$ at a third input/output port 103, as shown in cross section B1 in FIG. 3B.

Figure 3C:

For WDM signals $S_3$ entering the third input/output port 103 as shown in cross section C1 of FIG. 3C, the first birefringent element 100 divides the signals into complementary polarized components 70, 71 as shown in cross section C2 of FIG. 3C. The half-wave plate section 112 in the first polarization rotator 110 rotates beam 70 by 90° while the compensator section 113 compensates for the optical path that beam 70 travels through section 112. As a result, beams 70, 71 are phase-matched and are both vertically polarized, as shown in cross section C3 of FIG. 3C. Since for the second birefringent element 120, beams 70, 71 are ordinary beams, they pass through 120 without refraction, as shown in cross section C4 of FIG. 3C. The first half-wave plate 130 rotates beams 70, 71 clockwise by 45° as shown in cross section C5 of FIG. 3C. Faraday rotator 132 then rotates beams 70, 71 clockwise by an additional 45°, as shown in cross section C5 of FIG. 3C. Consequently, beams 70, 71 pass through non-reciprocal polarization rotator NPR with a net rotation of 90° from their original polarization states. The third birefringent element 140 refracts beams 70, 71 because they are horizontally polarized as shown in cross section C7 of FIG. 3C. Beams 70, 71 next pass though the second polarization rotator 150. The half-wave plate section 151 in the second polarization rotator 150 rotates beam 70 by 90°, as shown in cross section C8, while the compensation section 154 compensates beam 71 for the additional optical path that beam 70 takes through section 151. The fourth birefringent element 160 then combines beams 70 and 71 to form an output beam $S_3'$ at a fourth input/output port 104, as shown in cross section C9 in FIG. 3C.

Figure 3D:
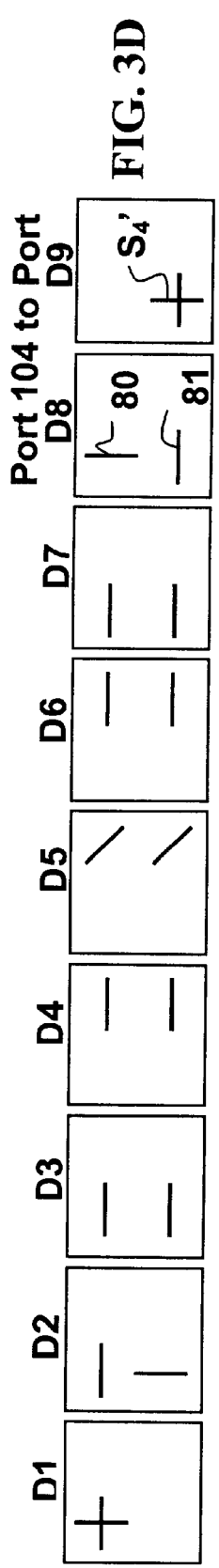

WDM signals $S_4$ entering the fourth input/output port 104 are routed to the first input/output port 101 as shown in FIG. 3D. As shown in cross section D9 of FIG. 3D, the signal $S_4$ contains complementary, e.g., horizontally and vertically polarized, components 80, 81. The fourth birefringent element 160 separates the complementary polarized components 80, 81 as shown in cross section D8 of FIG. 3D. The half-wave plate section 151 in the second polarization rotator 150 rotates beam 80 by 90° while the compensator section 154 compensates for the optical path that beam 80 travels through section 151. As a result, beams 80, 81 are phase-matched and are both horizontally polarized, as shown in cross section D7 of FIG. 3D. Consequently, beams 80, 81 are extraordinary beams for the third birefringent element 140. Thus, beams 80, 81 are refracted as they pass through the third birefringent element 140, as shown in cross section D6 of FIG. 3D. Faraday rotator 132 rotates beams 80, 81 clockwise by 45°, as shown in cross section D5 of FIG. 3D. The first half-wave plate 130 rotates beams 80, 81 counter-clockwise by 45° as shown in cross section D4 of FIG. 3D. Consequently, beams 80, 81 pass through non-reciprocal polarization rotator NPR without altering their original polarization states. Beams 80, 81 are extraordinary beams in the second birefringent element 120 because they are horizontally polarized. Consequently, the second birefringent element 120 refracts beams 80, 81 as shown in cross section D3 of FIG. 3D. The half-wave plate section 114 in the first polarization rotator 110 rotates beam 81 by 90°, as shown in cross section C2, while the compensation section 111 compensates for the optical path that beam 81 passes through section 114. The first birefringent element 100 then combines beams 80 and 81 to form an output beam $S_4'$ at the first input/output port 1, as shown in cross section D1 in FIG. 3D.

According to a second embodiment of the invention, the circulator described above with respect to FIGS. 2A–3D may be implemented in a compact folded design. An example of a folded four-port circulator 199 is depicted in the isometric diagram of FIG. 4. The circulator generally comprises a first birefringent element 200, a polarization rotator 210, a second birefringent element 220, and a non-reciprocal polarization rotator 230. The polarization rotator 210 is disposed between the first and second birefringent elements 200, 220 and the second polarization rotator 230 is disposed between the second birefringent element 220 and the retro-reflector 234. First, second, third, and fourth optical I/O ports 201, 202, 203, 204 are optically coupled to the first birefringent element 200. Optical signals travel to and from the four optical I/O ports in a direction substantially parallel to y-axis. The four-port circulator 199 couples optical signals arriving at the first port 201 to the second port 202. Optical signals arriving at the second port 202 are coupled to the third port 203. Optical signals arriving at the third port 203 are coupled to the fourth port 204. Optical signals arriving at the fourth port 204 are coupled to the first port 201. The I/O ports 201, 202, 203, 204 may each include a collimating lens, such as a graded refractive index (GRIN) lens, ball lens, or micro lens to couple optical signals between the circulator 199 and one or more optical fibers (not shown). Dual fiber collimators may also be used in the I/O ports as described above.

The first birefringent element 200 has an optic axis oriented to walk off components of optical signals that are polarized along a direction substantially parallel to the z-axis. The second birefringent element 220 has an optic axis oriented to walk off components of optical signals that are polarized along a direction substantially parallel to the x-axis.

The polarization rotator 210 includes four polarization rotation sections 212, 214, 216, 218 and four optical path compensation sections 211, 213, 215, 217. The optical path length through the optical path compensation sections 211, 213, 215, 217 is substantially the same as the optical path through the polarization rotation sections 212, 214, 216, 218. Each of the polarization sections 212, 214, 216, 218 may be a reciprocal polarization rotator that rotates the polarization of optical signals by substantially 90°. By way of example, each of the polarization rotation sections 212, 214, 216, 218 may be a half-wave plate characterized by an optic axis oriented at about 45° with respect to the x-axis. Other types of reciprocal rotators include liquid crystals, and optically active crystals such as Quartz, $TeO_2$, Te, Se, and $AgGaS_2$ may also be used.

The non-reciprocal polarization rotator 230 includes a waveplate section 231, a faraday rotator section 232 and a retro-reflector 234. The waveplate section 231 may rotate the polarization of optical signals by substantially 45° clockwise for optical signals traveling from right to left and 45° counterclockwise for signals traveling from left to right. By way of example, the waveplate section 231 may be characterized by an optic axis oriented at about 22.5° with respect to the x-axis. The faraday rotator section 232 rotates the polarization of optical signals by 45° clockwise independent of the direction of travel of the optical signals. The relative positions of the waveplate section 231 and the faraday rotator section 232 may be reversed as described above with respect to FIGS. 2B–2C. In such a case it is desirable to orient the optic axis of the waveplate section 231 at 67.5° with respect to the x-axis to provide a non-reciprocal polarization rotation function equivalent to that described above.

The retro-reflector 234 reflects optical signals traveling along a forward path substantially parallel to the y-axis such that they undergo a translation along the z-axis before being reflected again to travel along a reverse path that is substantially parallel to the y-axis but in the opposite direction to the forward path. By way of example, the retro-reflector may be a totally internally reflecting Porro prism having two reflecting faces 236, 238 that are substantially at right angles to each other. Alternatively, the retro-reflector may include two mirrors that are substantially at right angles to each other.

Figure 4:
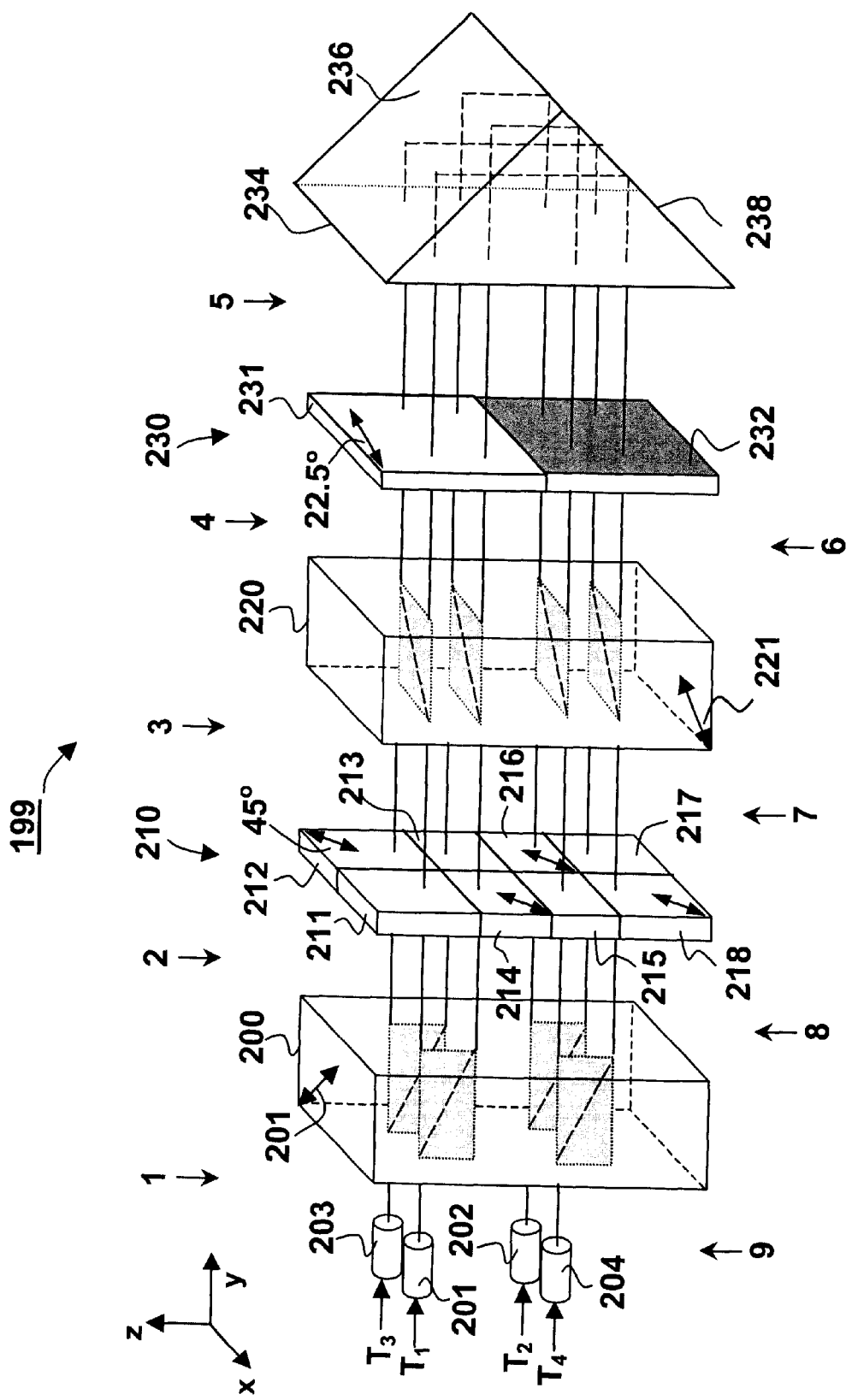
FIG. 4 depicts an isometric schematic of an optical circulator according to a second embodiment of the invention.
Figure 5:
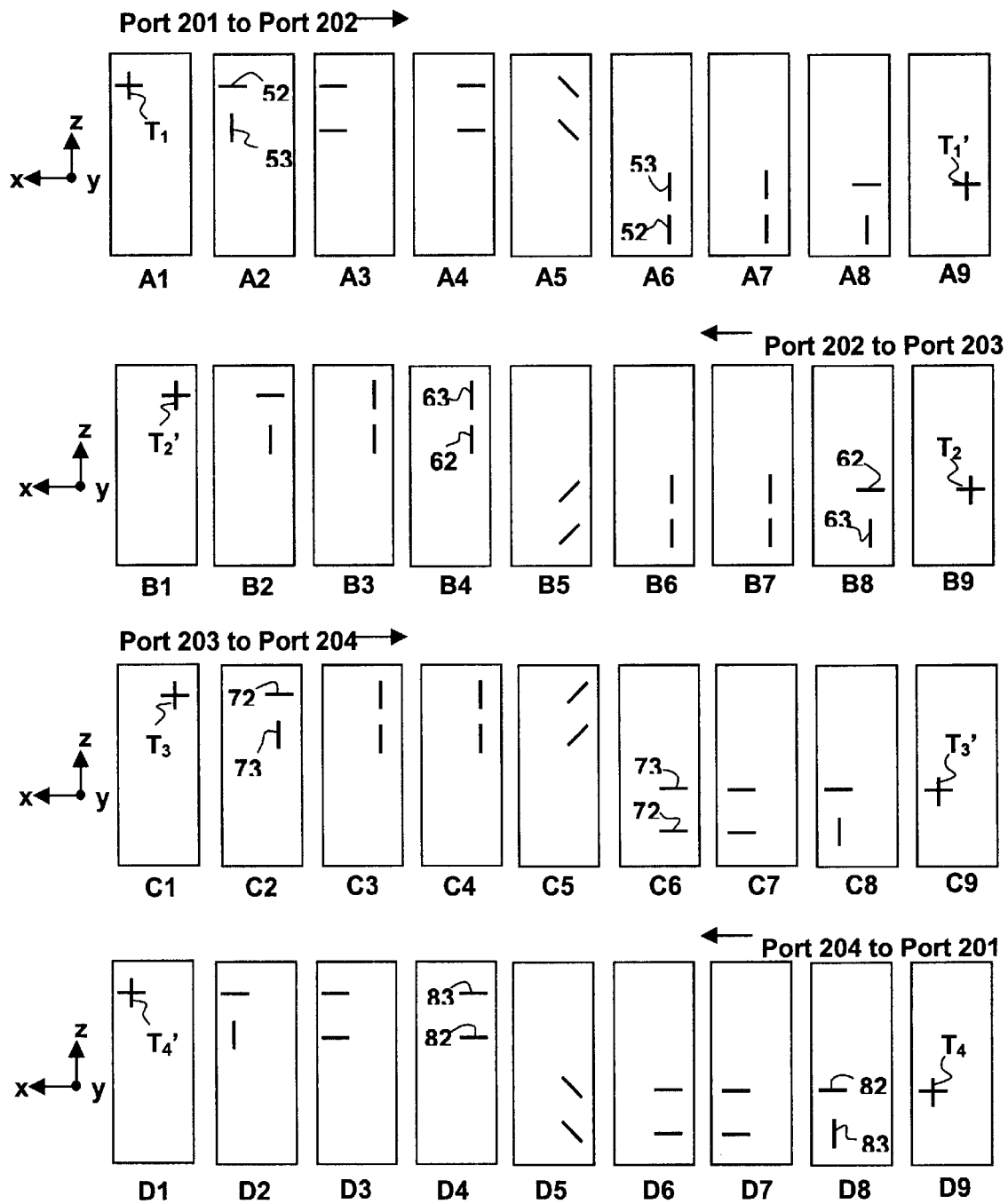
FIG. 5 depicts cross-sectional schematic diagrams of optical signals at different locations within the optical circulator of FIG. 4.

The operation of the optical circulator 199 may be understood by referring simultaneously to FIG. 4 and the cross-sectional diagrams of FIG. 5. For example, cross-sections A1–A9 depict the polarizations of optical signals traveling from the first I/O port 201 to the second I/O port 202. In cross-sections A1–A5 the signals are traveling from left to right along a forward path substantially parallel to the +y-axis (i.e., from left to right in FIG. 4). In cross-sections A6–A9 of FIG. 5 the signals are traveling along a reverse path substantially parallel to the −y-axis (i.e. from right to left in FIG. 4). In cross-section A1 an optical signal $T_1$ arrives at port 201 and is coupled to the first birefringent element 200. The first birefringent element 200 separates the optical signal $T_1$ into complementarily polarized components 52 and 53 as shown in cross-section A2. By way of example, component 52 is polarized substantially parallel to the x-axis and component 53 is polarized substantially parallel to the z-axis. Thus, the first birefringent element 200 walks off component 53 from component 52. The two components next enter the polarization rotator 210. Component 52 passes through optical path compensation section 211. Component 53 passes through polarization rotation section 214 and has its polarization rotated 90° so that it is substantially parallel to component 52 as shown in cross-section A3. The second birefringent element 220 walks off both components 52, 53 as shown in cross-section A4. Both components 52, 53 pass through the waveplate section 231 of the non-reciprocal polarization rotator 230. Because components 52, 53 are traveling from left to right, the waveplate section 231 rotates the polarizations of both components by 45° clockwise as shown in cross-section A5. Both components 52, 53 are then reflected by the first reflecting surface 236 of the retro-reflector 234. The two components 52, 53 travel substantially parallel to the −z-axis through the retro-reflector until they are reflected by the second reflecting face 238. Although, components 52 and 53 take different paths through the retro-reflector, the optical path length through the retro-reflector 238 is the same for both components.

Components 52, 53 emerge from the retro-reflector 234 and travel through the faraday rotator section 232 traveling along a reverse path from right to left. The faraday rotator section 232 rotates the polarizations of both components by 45° clockwise. Thus, the net effect of the non-reciprocal polarization rotator 230 is to rotate the polarization of components 52 and 53 by 90° such that they are both substantially parallel to the z-axis as shown in cross-section A6 of FIG. 5. Components 52, 53 next enter the second birefringent element 200. Because both components 52, 53 are polarized substantially parallel to the z-axis, they are ordinary rays in the second birefringent element 220 and, hence, emerge substantially undetected as shown in FIG. A7. Components 52, 53 next enter the polarization rotator 210. Component 53 travels through polarization rotation section 216 and component 52 travels through optical path compensation section 217. Polarization section 216 rotates the polarization of component 53 by 90° as shown in cross-section A8. Components 52, 53 then enter the first birefringent element 200, which walks component 52 toward component 53 to recombine the two components to form an output signal $T_1'$ as shown in cross-section A9. Output signal $T_1'$ is coupled to the second I/O port 202.

Cross-sections B9–B1 of FIG. 5 illustrate how the circulator 199 couples optical signals from the second port 202 to the third port 203. In cross-sections B9–B5 the signals travel along a forward path substantially parallel to the +y-axis (i.e., from left to right in FIG. 4). In cross-sections B4–B1 of FIG. 5 the signals are traveling from right to left along a reverse path substantially parallel to the −y-axis (i.e. from right to left in FIG. 4). In cross-section B9 an optical signal $T_2$ arrives at port 202. The first birefringent element 200 separates the optical signal $T_2$ into complementarily polarized components 62 and 63 by walking off component 63 from component 62 as shown in cross-section B8. Components 62 and 63 next enter the polarization rotator 210. Component 63 passes through optical path compensation section 217. Component 62 passes through polarization rotation section 216 and has its polarization rotated 90° so that components 62 and 63 are substantially parallel to the z-axis as shown in cross-section B7. Components 62 and 63 next enter the second birefringent element 220, where they are both ordinary rays and are, therefore, not deflected as shown in cross-section B6. Both components 62, 63 pass through the faraday rotator section 232 of the non-reciprocal rotator 230. The faraday rotator section 232 rotates the polarizations of components 62 and 63 by 45° clockwise as shown in cross-section B5. Both components 62, 63 are then reflected by the second reflecting surface 238 of the retroreflector 234. The two components 62, 63 travel substantially parallel to the +z-axis through the retro-reflector 234 until they are reflected by the first reflecting face 236. Components 62, 63 emerge from the retro-reflector 234 and travel through the waveplate section 231 traveling along a reverse path from right to left. Because the components 62, 63 travel from right to left, the waveplate section 231 rotates the polarizations of both components by 45° counterclockwise. Thus, the net effect of the non-reciprocal polarization rotator 230 is to rotate the polarization of components 62 and 63 by 0° such that they are both substantially parallel to the z-axis as shown in FIG. B4. Components 62, 63 next enter the second birefringent element 220. Because both components 62, 63 are polarized substantially parallel to the z-axis they are ordinary rays in the second birefringent element 220 and, hence, emerge substantially undeflected as shown in FIG. B3. Components 62, 63 next enter the polarization rotator 210. Component 63 travels through polarization rotation section 212 and component 62 travels through optical path compensation section 213. Polarization section 212 rotates the polarization of component 63 by 90° as shown in cross-section B2. Components 62, 63 then enter the first birefringent element 200, which walks component 62 toward component 63 to recombine the two components to form an output signal $T_2'$ as shown in cross-section B1. Output signal $T_2'$ is coupled to the third I/O port 203.

Cross-sections C1–C9 depict the polarizations of optical signals traveling from the third I/O port 203 to the fourth I/O port 204. In cross-sections C1–C5 the signals travel along a forward path substantially parallel to the +y-axis (i.e., from left to right in FIG. 4). In cross-sections C6–C9 of FIG. 5 the signals are traveling from left to right along a reverse path substantially parallel to the −y-axis (i.e. from right to left in FIG. 4). An optical signal $T_3$ arrives at the third I/O port 203 as shown in cross-section C1 and is coupled to the first birefringent element 200, which separates the signal $T_3$ into complementarily polarized components 72 and 73 as shown in cross-section C2. Component 72 passes through polarization rotation section 212 of the polarization rotator 210. Component 73 passes through optical path compensation section 213. The polarization of component 72 is rotated 90° so that it is substantially parallel to component 73 as shown in cross-section C3. Both components 72, 73 are ordinary rays in the second birefringent element 220 and are, therefore, not deflected as shown in cross-section C4. Both components 72, 73 pass through the waveplate section 231 of the non-reciprocal polarization rotator 230, which rotates the polarizations of both components by 45° clockwise as shown in cross-section C5. The retro-reflector 234 reflects and translates both components 72, 73. Both components 72, 73 emerge from the retro-reflector 234 and travel through the faraday rotator section 232 traveling along a reverse path from right to left. The faraday rotator section 232 rotates the polarizations of both components by 45° clockwise. Thus, the net effect of the non-reciprocal polarization rotator 230 is to rotate the polarization of components 72 and 73 by 90° such that they are both substantially parallel to the x-axis as shown in cross-section C6 of FIG. 5. Components 72, 73 next enter the second birefringent element 200. Because both components 72, 73 are polarized substantially parallel to the x-axis they are extraordinary rays in the second birefringent element 220 and, hence, are deflected parallel to the x-axis as shown in FIG. C7. Component 72 travels through polarization rotation section 218 and component 73 travels through optical path compensation section 215. Polarization section 218 rotates the polarization of component 72 by 90° as shown in cross-section D8. Components 72, 73 then enter the first birefringent element 200, which walks component 72 toward component 73 to recombine the two components to form an output signal $T_3'$ as shown in cross-section C9. Output signal $T_3'$ is coupled to the fourth I/O port 204.

Cross-sections D9–D1 of FIG. 5 illustrate how the circulator 199 couples optical signals from the fourth port 204 to the first port 201. In cross-sections D9–D5 the signals travel along a forward path substantially parallel to the +y-axis (i.e., from left to right in FIG. 4). In cross-sections D4–D1 of FIG. 5 the signals travel from left to right along a reverse path substantially parallel to the −y-axis (i.e. from right to left in FIG. 4). In cross-section D9 an optical signal $T_4$ arrives at port 204. The first birefringent element 200 separates the optical signal $T_4$ into complementarily polarized components 82 and 83 by walking off component 83 from component 82 as shown in cross-section D8. Component 82 passes through optical path compensation section 215. Component 83 passes through polarization rotation section 218 and has its polarization rotated 90° so that components 82 and 83 are substantially parallel to the x-axis as shown in cross-section D7. Components 82 and 83 next enter the second birefringent element 220, where they are both extraordinary rays and are, therefore, deflected along the x-axis as shown in cross section D6. Both components 82, 83 pass through the faraday rotator section 232 of the non-reciprocal rotator 230. The faraday rotator section 232 rotates the polarizations of components 82 and 83 by 45° clockwise as shown in cross-section D5. Both components 82, 83 are then reflected and shifted by the retro-reflector 234. Components 82, 83 emerge from the retro-reflector 234 and travel through the waveplate section 231 from right to left. The waveplate section 231 rotates the polarizations of both components by 45° counterclockwise. Thus, the net effect of the non-reciprocal polarization rotator 230 is to rotate the polarization of components 82 and 83 by 0° such that they are both substantially parallel to the x-axis as shown in FIG. D4. Components 82, 83 next enter the second birefringent element 220, where they are both extraordinary rays. The second birefringent element 220 deflects both components 82, 83 parallel to the x-axis as shown in FIG. D3. Component 82 travels through polarization rotation section 214 and component 83 travels through optical path compensation section 211. Polarization section 214 rotates the polarization of component 82 by 90° as shown in cross-section D2. The first birefringent element 200, walks component 82 toward component 83 to recombine the two components to form an output signal $T_4'$ as shown in cross-section D1. Output signal $T_4'$ is coupled to the first I/O port 201.

Figure 6:
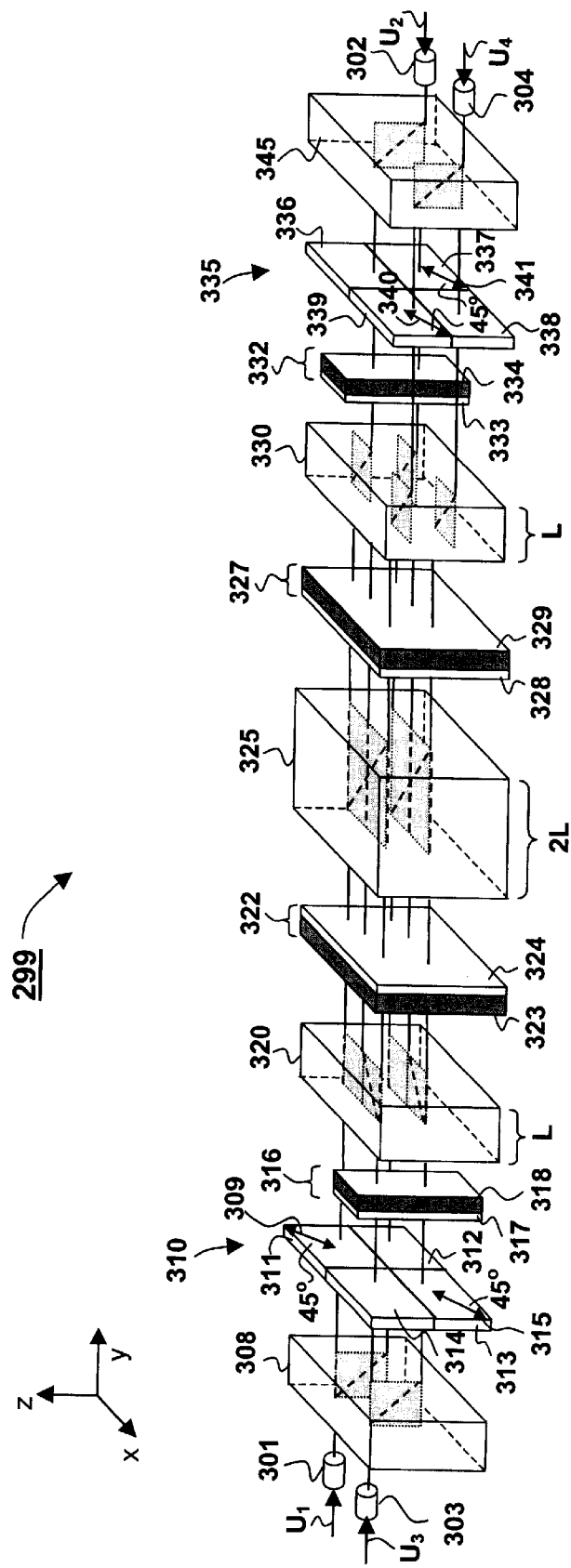
FIG. 6 depicts an isometric schematic of an optical circulator according to a third embodiment of the invention.

The circulators described above with respect to FIGS. 2A–5 provide an acceptable level of cross-talk isolation between the ports. The cross-talk may result in part because the optical paths for different signals partially overlap. For example, between the second and third birefringent elements 120, 140 in FIG. 2A signals traveling from the first port 101 to the second port 102 may overlap with signals traveling from the third port 103 to the fourth port 104. If the non-reciprocal polarization rotator NPR rotates the polarization of these signals by two much or too little, cross-talk may result. Although isolation can be quite high between the first and third ports 101, 103 and between the second and fourth ports 102, 104, cross-talk may result, for example, from undesired coupling of signals from the first port 101 to the fourth port 104 or from the second port 102 to the first port 101. Similarly, undesired coupling may occur from the third port 103 to the second port 102 or from the fourth port 104 to the third port 103. However, to achieve isolation of greater than about 40 dB say between the first port 101 and the fourth port 104 requires a high degree of precision in the alignment of the nonreciprocal polarization rotator NPR in FIG. 2A or the non-reciprocal polarization rotator 230 in FIG. 4. The high degree of precision can lead to an unacceptably low yield of usable devices. Several variations are possible on the circulators depicted in FIGS. 2A–5 that improve cross-talk isolation by offsetting the optical paths so that they do not overlap. For example, FIG. 6 depicts an isometric diagram of a four port optical circulator 299 according to a third embodiment of the invention. The circulator 299 is designed to have improved isolation, which reduces cross-talk due to undesired coupling of signals between ports. The circulator 299 generally includes first, second, third, fourth and fifth birefringent elements 308, 320, 325, 330, 345, first and second polarization rotators 310, 335 and first, second, third, and fourth non-reciprocal polarization rotators 316, 322, 327, 332. First, second, third and fourth I/O ports 301, 302, 303, 304 may be coupled to the circulator. The I/O ports 301, 302, 303, 304 may each include a collimating lens, such as a graded refractive index (GRIN) lens, ball lens, or micro lens to couple optical signals between the circulator 299 and one or more optical fibers (not shown). Dual fiber collimators may also be used in the I/O ports as described above. In the example shown in FIGS. 6–7D the first and fourth non-reciprocal polarization rotators 316, 332 are configured to allow selected optical signals to bypass while intercepting other optical signals.

The components are arranged in a substantially linear fashion as shown in FIG. 6. The first polarization rotator 310 is disposed between the first birefringent element 308 and the first non-reciprocal polarization rotator 316. The first polarization rotator includes polarization rotation sections 311, 313 and optical path compensation sections 312, 314. The polarization rotation sections 311, 313 may be reciprocal rotators, such as half waveplates having optical axes 309, 315 oriented at 45° with respect to the x-axis. Other types of reciprocal rotators include liquid crystals, and optically active crystals such as Quartz, $TeO_2$, Te, Se, and $AgGaS_2$ may also be used. The first non-reciprocal polarization rotator 316 may include a half waveplate section 317 and a faraday rotator section 318. The faraday rotator section is disposed between the half-waveplate section 317 and the second birefringent element 320. The first non-reciprocal polarization rotator 316 is substantially aligned with one half of the first polarization rotator 310. In particular optical signals traveling to and from polarization rotation section 313 and optical path compensation section 314 also pass through the first non-reciprocal polarization rotator 316. The width and position of the first non-reciprocal polarization rotator 316 are chosen such that optical signals traveling to and from polarization rotation section 311 and optical path compensation section 312 bypass the first non-reciprocal polarization rotator 316.

The second birefringent element 320 is disposed between the first and second non-reciprocal polarization rotators 316, 322. The second birefringent element 320 is characterized by a length L. The second non-reciprocal polarization rotator 322 includes a faraday rotator 323 and a half waveplate 324. In the example shown in FIG. 6, the faraday rotator 323 is disposed between the second birefringent element 320 and the half waveplate 324 and the half waveplate 324 is disposed between the faraday rotator 323 and the third birefringent element 325. Alternatively, the relative positions of the faraday rotator 323 and waveplate 324 may be switched as described above with respect to FIGS. 2B–2C. The third birefringent element 325 is disposed between the second and third non-reciprocal polarization rotators 322, 327. The third birefringent element 325 is characterized by a length 2L, which is twice the length L of the second birefringent element 320. The third non-reciprocal polarization rotator 327 includes a half waveplate 328 and a faraday rotator 329. In the example shown in FIG. 6, the half waveplate 328 is disposed between the third birefringent element 325 and the faraday rotator 329. The faraday rotator 329 is disposed between the half waveplate 328 and the fourth birefringent element 330. Again the relative positions of the half waveplate 328 and the faraday rotator 329 may be switched as described above with respect to FIGS. 2B–2C.

The fourth birefringent element 330 is disposed between the third and fourth non-reciprocal polarization rotators 327, 332. The fourth birefringent element 330 is characterized by a length L, which is substantially the same as the length of the second birefringent element 320. The fourth non-reciprocal polarization rotator 332 includes a half waveplate 333 and a faraday rotator 334. In the example, shown in FIG. 6, the half waveplate 333 is disposed between the fourth birefringent element 330 and the faraday rotator 334. The faraday rotator 334 is disposed between the half-wave plate 333 and the second polarization rotator 335. The second polarization rotator 335 is disposed between the fourth non-reciprocal polarization rotator 332 and the fifth birefringent element 345. As described above, the relative positions of the half waveplate 333 and faraday rotator 334 may be switched while obtaining the same non-reciprocal polarization rotation function. The second polarization rotator 335 includes polarization rotation sections 337, 339 and optical path compensation sections 336, 338. The polarization rotation sections 339, 337 may be half-wave plates having optical axes 340, 341 oriented at 45° with respect to the x-axis. The polarization rotation sections 337, 339 of the second polarization rotator 335 are substantially aligned with the optical path compensation sections 312, 314 of the first polarization rotator 310. Similarly, the optical path compensation sections 336, 338 of the second polarization rotator are substantially aligned with the polarization rotation sections 311, 313 of the first polarization rotator 310. The fourth non-reciprocal polarization rotator 332 is substantially aligned with one half of the second polarization rotator 335. In particular optical signals traveling to and from polarization rotation section 337 and optical path compensation section 336 also pass through the fourth non-reciprocal polarization rotator 332. The width and position of the fourth non-reciprocal polarization rotator 332 are chosen such that optical signals traveling to and from polarization rotation section 339 and optical path compensation section 338 bypass the fourth non-reciprocal polarization rotator 332.

In the example depicted in FIGS. 6–7D optical signals that are polarized along the z-axis are extraordinary rays in the first and fifth birefringent elements 308, 345 and ordinary rays in second, third and fourth birefringent elements 320, 325, 330. Optical signals that are polarized along the x-axis are ordinary rays in the first and fifth birefringent elements 308, 345 and extraordinary rays in second, third and fourth birefringent elements 320, 325, 330. Thus the first and fifth birefringent elements 308, 345 transmit x-axis polarized optical signals substantially undeflected, but walk off z-axis polarized optical signals along the z-axis. Similarly, the second, third, and fourth birefringent elements 320, 325, 330 transmit z-axis polarized optical signals substantially undeflected but walk off x-axis polarized optical signals along the x-axis. Preferably, the second, third, and fourth birefringent elements 320, 325, 330 are made from the same birefringent material and deflect extraordinary rays traveling along the y-axis by an angle α.

Optical signals passing through the first, third and fourth non-reciprocal polarization rotators 316, 327, 332 along the −y-axis from right to left experience no net polarization rotation. Optical signals passing through the same non-reciprocal polarization rotators along the y-axis from left to right experience a net polarization rotation of 90°. Optical signals passing through the second non-reciprocal polarization rotator 322 along the y-axis from left to right experience no net polarization rotation. Optical signals passing through the second nonreciprocal polarization rotator 322 along the −y-axis from right to left experience a net polarization rotation of 90°.

In the example depicted in FIGS. 6–7D, first and third I/O ports 301, 303 are coupled to the first birefringent element 308. Second and fourth I/O ports 302, 304 are coupled to the fifth birefringent element 345. The first and third ports 301, 303 are slightly offset in the z-direction with respect to the second and fourth ports 302, 304. The first and third ports 301, 303 are also slightly offset in the x-direction with respect to the second and fourth ports 302, 304. The circulator 299 couples optical signals from the first I/O port 301 to the second port 302, from the second port 302 to the third port 303, from the third port 303 to the fourth port 304 and from the fourth port 304 to the first port 301.

The operation of the circulator 299 is best understood by simultaneously referring to FIG. 6 and the cross-sectional diagrams of FIGS. 7A–7D. The upper cross sections of FIGS. 7A–7D are views looking down upon the circulator 299 along the z-axis. In the lower cross-sections of FIGS. 7A–7D the view is along the signal path with the signal coming out of the page, i.e. parallel to the y-axis. At cross-section A1 FIG. 7A an optical signal $U_1$ is coupled to the first I/O port 301. The first birefringent element 308 separates the signal $U_1$ into beams 54, 55, having complementary polarizations as shown in cross section A2 of FIG. 7A. Polarization rotation section 311 of the first polarization rotator 310 rotates the polarization of beam 54 such that the polarizations of both beams 54, 55 are substantially parallel to the z-axis as shown in cross-section A3. Both beams 54, 55 bypass the first non-reciprocal rotator 316 and enter the second birefringent element 320, where they are ordinary rays. Beams 54, 55 pass through the second birefringent element substantially undeflected and pass through the second non-reciprocal polarization rotator 322. Because beams 54, 55 are traveling from left to right, the second non-reciprocal polarization rotator 322 does not rotate the polarization of either beam. Thus both beams 54, 55 are still polarized substantially parallel to the z-axis and are, therefore, ordinary rays in the third birefringent element 325. Beams 54, 55 therefore pass through the third birefringent element 325 substantially undeflected as shown in cross-section A4. The third non-reciprocal polarization rotator 327 rotates the polarizations of the beams 54, 55 by 90° as shown in cross-section A5 of FIG. 7A. The fourth birefringent element 330 deflects both beams 54, 55 by an angle a, thereby walking off both beams along the x-axis as shown in cross section A6. The fourth non-reciprocal polarization rotator 332 rotates the polarizations of both beams 54, 55 by 90° as shown in cross-section A7. The beams pass through the second polarization rotator 335. Beam 54 passes through optical path compensation section 336. Beam 55 passes through polarization rotation section 337, which rotates the polarization of beam 55 by 90° as shown in cross-section A8. The fifth birefringent element walks beam 54 along the z-axis to combine it with beam 55 to form an output signal $U_1'$ as shown in cross-section A9. The output signal $U_1'$ optically couples from the fifth birefringent element 345 to the second I/O port 302.

FIG. 7B illustrates how the optical circulator 299 optically couples a signal $U_2$ from the second I/O port 302 to the third I/O port 303. The signal $U_2$ travels substantially parallel to the y-axis from right to left in FIG. 7B. The signal $U_2$ optically couples from the second I/O port 302 to the fifth birefringent element 345 as shown in cross-section B9. The fifth birefringent element 345 walks off z-axis polarized component 64 from an x-axis polarized component 65 as shown in cross-section B8. Component 64 passes through optical path compensation section 336 of the second polarization rotator 335 while component 65 passes through polarization rotation section 337, which rotates the polarization of component 65 by 90° as shown in cross-section B7. Both components 64, 65 pass through the fourth non-reciprocal polarization rotator 332, the fourth birefringent element 330, the third non-reciprocal polarization rotator 327, and the third birefringent element 325 substantially undeflected and substantially without polarization rotation as shown in cross-section B6. The second non-reciprocal polarization rotator 322 rotates the polarizations of both components 64, 65 by 90° as shown in cross section B5. The second birefringent element 320 deflects both components 64, 65 by an angle a such that they walk off along the x-axis as shown in cross-section B4. Both components pass through the first non-reciprocal polarization rotator 316 substantially without polarization rotation as shown in cross-section B3. The components 64, 65 pass through the first polarization rotator 310. Component 64 passes through optical path compensation section 314 while component 65 passes through polarization rotation section 313, which rotates the polarization of component 65 by 90° as shown in cross-section B2. The first birefringent element 308 walks component 65 along the z-axis towards component 64 thereby combining the two components to form an output signal $U_2'$ as shown in cross-section B1. The output signal $U_2'$ optically couples from the first birefringent element 308 to the third I/O port 303.

FIG. 7C illustrates how the optical circulator 299 optically couples a signal $U_3$ from the third I/O port 303 to the fourth I/O port 304. The signal $U_3$ travels substantially parallel to the y-axis from left to right in FIG. 7C. The signal $U_3$ optically couples from the third I/O port 303 to the first birefringent element 308 as shown in cross-section C1. The first birefringent element 308 walks off z-axis polarized component 75 from an x-axis polarized component 74 as shown in cross-section C2. Component 74 passes through optical path compensation section 314 of the first polarization rotator 310 while component 75 passes through polarization rotation section 313, which rotates the polarization of component 75 by 90° as shown in cross-section C3. Both components 74, 75 pass through the first non-reciprocal polarization rotator 316, which rotates their polarizations by 90° as shown in cross-section C4. Both components 74, 75 pass through the second birefringent element 320, the second non-reciprocal polarization rotator 322, and the third birefringent element 325 substantially undeflected and substantially without polarization rotation as shown in cross-section C5. The third non-reciprocal polarization rotator 327 rotates the polarizations of both components 74, 75 by 90° as shown in cross section C6. The fourth birefringent element 330 deflects both components 74, 75 by an angle α such that they walk off along the x-axis as shown in cross-section C7. Both components bypass the fourth non-reciprocal polarization rotator 332. The components 74, 75 pass through the second polarization rotator 335. Component 75 passes through optical path compensation section 338 while component 74 passes through polarization rotation section 339, which rotates the polarization of component 74 by 90° as shown in cross-section C8. The fifth birefringent element 345 walks component 74 along the z-axis towards component 75 thereby combining the two components to form an output signal $U_3'$ as shown in cross-section C9. The output signal $U_3'$ optically couples from the fifth birefringent element 345 to the fourth I/O port 304.

FIG. 7D illustrates how the optical circulator 299 optically couples a signal $U_4$ from the fourth I/O port 304 to the first I/O port 301. The signal $U_4$ travels substantially parallel to the y-axis from right to left in FIG. 7D. The signal $U_4$ optically couples from the fourth I/O port 304 to the fifth birefringent element 345 as shown in cross-section D9. The fifth birefringent element 345 walks off z-axis polarized component 84 from an x-axis polarized component 85 as shown in cross-section D8. Component 85 passes through optical path compensation section 338 of the second polarization rotator 335 while component 84 passes through polarization rotation section 339, which rotates the polarization of component 84 by 90° as shown in cross-section D7. Both components 84, 85 bypass the fourth non-reciprocal polarization rotator 332 and enter the fourth birefringent element 330. The fourth birefringent element 330 deflects both components 84, 85 at an angle α such that they walk off along the x-axis as shown in cross-section D6. Both components pass through the third non-reciprocal polarization rotator 327 without substantial polarization rotation and enter the third birefringent element 325. The third birefringent element 325 deflects both components 84, 85 by an angle α such that they walk off along the x-axis as shown in cross-section D5. The second non-reciprocal polarization rotator 322 rotates the polarizations of both components 84, 85 by 90° as shown in cross section D4. Both components 84, 85 pass through the second birefringent element 320 substantially undeflected as shown in cross-section D3. Both components 84, 85 bypass the first non-reciprocal polarization rotator 316. The components 84, 85 pass through the first polarization rotator 310. Component 85 passes through optical path compensation section 312 while component 84 passes through polarization rotation section 311, which rotates the polarization of component 84 by 90° as shown in cross-section D2. The first birefringent element 308 walks component 85 along the z-axis towards component 84 thereby combining the two components to form an output signal $U_4'$ as shown in cross-section D1. The output signal $U_4'$ optically couples from the first birefringent element 308 to the first I/O port 301.

It is possible that the polarization rotators 310, 335 or the non-reciprocal polarization rotators 316, 322, 327, 332 may rotate the polarization of the components of the signal $U_1$ either too much or too little. In either case, the birefringent elements 308, 320, 325, 330 and 345 may receive optical signals with some component having the "wrong" polarization. The optical circulator 299 is designed to significantly reduce the likelihood that components having the "wrong" polarization will couple to the "wrong" I/O port and cause cross-talk. The improved optical isolation provided by the optical circulator 299 is illustrated by way of example in FIG. 8 wherein an optical signal $U_1$ travels from the first I/O port 301 to the second I/O port 302. The optical signals proceed from the first I/O port through the components of the optical circulator 299 substantially as described above with respect to FIG. 7A. If, however the first polarization rotator 310 rotates the components of signal $U_1$ too much or too little, optical signals having both a z-axis polarized component 350 and an x-axis polarized component 352 may enter the second birefringent element 320. The second birefringent element 320 walks off the x-axis polarized component 352 along the x-axis in such a way that they are deflected out of the circulator 299. It is also possible that the second non-reciprocal polarization rotator 322 may rotate the z-axis polarized component 350 by too much or too little, thereby producing an x-axis polarized component 354. A z-axis polarized component 356 may be produced by over-rotation or under-rotation of the x-axis polarized component 350 by the third polarization rotator 327. The z-axis polarized component 356 bypasses the second output port 302 as a result of the x-axis offset between the first and second I/O ports 301, 302. The second birefringent element 325 walks off the x-axis polarized component 354 along the x-axis. At this stage, component 354 may be attenuated by about 25 dB with respect to component 350. The third polarization rotator 327 may rotate the x-axis polarized component 354 by too much or too little such that the fourth birefringent element 330 splits the x-axis polarized component 354 into an x-axis polarized component 358 and a z-axis polarized component 360. Because of the x-axis offset, the z-axis polarized component 360 ultimately passes between the second and fourth I/O ports 302, 304 independent of any over-rotation or under-rotation by the second polarization rotator 335. Part of the x-axis polarized component 358 may couple to the fourth output port 304 but this portion is quite attenuated because component 358 may experience an additional attenuation of about 25 dB with respect to component 360. Thus the intensity ratio of component 358 to component 350 may be −50 dB or more in 4-port circulator 299.

Figure 8:
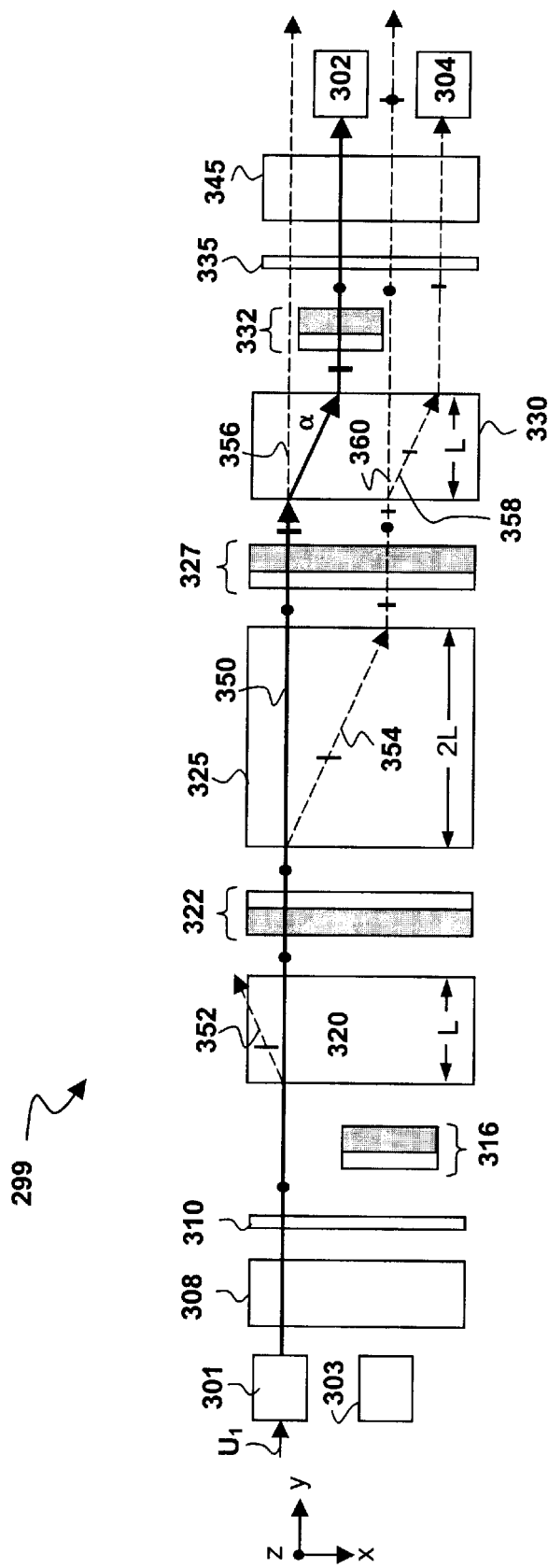
FIG. 8 depicts a schematic diagram illustrating optical isolation in the optical circulator of FIG. 6.
Figure 9:
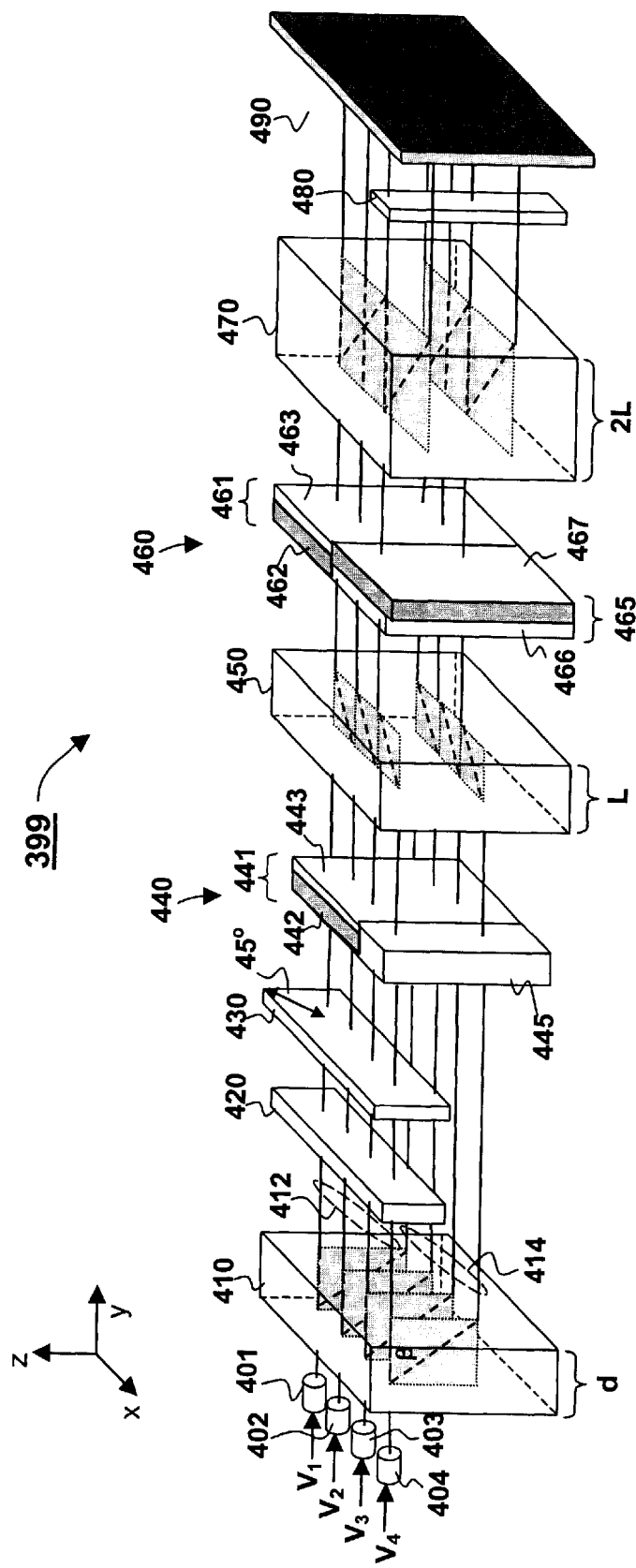
FIG. 9 depicts an isometric schematic of an optical circulator according to a fourth embodiment of the invention.

The high-isolation features of the four-port circulator shown in FIGS. 6–8 may be incorporated into a circulator having a folded design. FIG. 9 illustrates a four-port circulator 399 according to a fourth embodiment of the present invention. The circulator 399 generally comprises an array of equally spaced input/output (I/O) ports 401, 402, 403, 404, first, second, and third birefringent elements 410, 450, 470, and first, second, third, and fourth polarization rotators 430, 440, 460, 480. The circulator 399 further comprises an optical path compensator 420, and a retro-reflector 490. These elements are typically arranged in the order depicted in FIG. 9. The four I/O ports 401, 402, 403, 404 are arranged side-by-side in a substantially flat array. Thus, the four-port circulator 399 may be compatible with flat fiber arrays, such as v-groove fiber arrays. The I/O ports 401, 402, 403, 404 may each include a collimating lens, such as a graded refractive index (GRIN) lens, ball lens, or micro lens to couple optical signals between the circulator 399 and one or more optical fibers (not shown). Dual fiber collimators may also be used in the I/O ports as described above.

The first birefringent element 410 has a thickness d measured along the y-axis. The first birefringent element 410 has an optical axis substantially parallel to the y-z plane so that it refracts light having z-axis polarized component. The second and third birefringent elements 450, 470 are substantially parallel to the x-y plane. The third birefringent element 470 may have a thickness 2L that is twice the thickness L of the second birefringent element 450. The first polarization rotator 420 is a reciprocal polarization rotator such as first half-wave plate. Other types of reciprocal rotators include liquid crystals, and optically active crystals such as Quartz, $TeO_2$, Te, Se, and $AgGaS_2$ may also be used. The second polarization rotator 440 includes a first non-reciprocal polarization rotator 441, and a second half-wave plate segment 445. The first non-reciprocal polarization rotator 441 generally comprises a first Faraday rotator 442 followed by a second half-wave plate 443 with its optical axis oriented at −45° with respect to x-axis. As described in FIGS. 2B and 2C, beams with either horizontal or vertical polarization traveling from Faraday rotator 442 to half-waveplate 443 will maintain their original polarizations. Beams traveling in the reserve direction will flip their polarizations by 90°. The relative positions of the first faraday rotator 442 and half-waveplate 443 may be switched as described above with respect to FIGS. 2B–2C. The third polarization rotator 460 includes a second non-reciprocal polarization rotator 461 and a third non-reciprocal polarization rotator 465. The second and third non-reciprocal polarization rotators 461 and 465 are placed adjacent to each other with Faraday rotator and half-wave plate in reverse order. The fourth polarization rotator 480 converts z-axis polarized beams to x-axis polarization upon reflection from the retro-reflector 490. The fourth polarization rotator 480 also converts x-axis polarized beams to z-axis polarization upon reflection from the retro-reflector 490. By way of example, the fourth polarization rotator 480 may be a quarter-waveplate having fast and slow axes oriented to convert linearly polarized light to circularly polarized light and to convert circularly polarized light to linearly polarized light. The optical path compensator 420 compensates for optical path difference between the horizontally polarized components 412 and vertically polarized components 414 as they travel through the first birefringent element 410.

The method of operation of the four-port bi-directional circulator 399 can be understood by referring to FIGS. 10A, 10B, which depict cross-sectional views looking down on the components of FIG. 9. By way of example, one or more un-polarized WDM signal $V_1$ enters the first birefringent element 410 from the first I/O port 401, as shown in FIG. 10A. The un-polarized signal $V_1$ may include both vertical (z-axis polarized) component denoted by a dot, and horizontal (x-axis polarized) component denoted by a vertical line segment. The first birefringent element 410 divides signal $V_1$ into a z-axis polarized extraordinary beam 56 and x-axis polarized ordinary beam 57. The ordinary beam 57 passes through the first birefringent element substantially without refraction. The extraordinary beam 56 is refracted at an angle β as indicated in FIG. 9. Thus the two beams 56, 57 are spatially separated along z-axis when they exit the first birefringent element 410. The optical path of beam 56 through the first birefringent element 410 is characterized by an optical path length given by $n_e(\beta) \cdot d / \cos(\beta)$, where $n_e(\beta)$ is the index of refraction for the extraordinary beam propagating through the first birefringent element 410 at angle β. The optical path of beam 57 through the first birefringent element 410 is characterized by an optical path length given by $n_o \cdot d$, where $n_o$ is the index of refraction for an ordinary beam propagating through the first birefringent element 410. Thus the optical path difference between beam 56 and 57 for the first birefringent element 410 is $OPD = n_e(\beta) \cdot d / \cos(\beta) - n_o \cdot d$. The optical path difference OPD may lead to a phase difference between the two beams 56 and 57. The optical path compensator ensures that beams 56, 57 are phase-matched. The optical path compensator 420 may be made from any transparent material with an optical path $n_g \cdot t$ equal to OPD, where $n_g$ is the index of refraction of the transparent material.

The first polarization rotator 430 converts x-axis polarized beam 57 to z-axis polarization. Both beams 56, 57 bypass the second polarization rotator 440. The optical axis of the second birefringent element 450 is substantially parallel to the x-y plane. Thus both beams 56, 57 are ordinary rays in the second birefringent element 450 and, therefore, propagate through the second birefringent element 450 substantially without refraction. The second non-reciprocal polarization rotator 461 is optically coupled between the second and third birefringent element 450, 470. The second non-reciprocal polarization rotator 461 is arranged with its Faraday rotator plate 462 on the left and half-wave plate 463 on the right. Thus vertically polarized beams 56, 57 traveling from left through element 461 do not change polarization as previously described. The beams 56, 57 are ordinary beams in third birefringent element 470. Therefore, both beams 56, 57 pass through the third birefringent element 470 without refraction. In the example depicted in FIG. 9, the retro-reflector 490 is a plane reflecting surface, such as a mirror. The retro-reflective mirror 490 reflects beams 56, 57 back along a reverse path without changing polarization or significantly shifting the reverse path of beams 56, 57 perpendicular to the y-axis. The second non-reciprocal polarization rotator 461 converts z-axis polarized beams 56, 57 to x-axis polarization. The second birefringent element 450 refracts both x-axis polarized beams 56, 57 so that beams 56, 57 are shifted parallel to the x-axis. The first non-reciprocal polarization rotator 441 converts beams 56, 57 back to z-axis polarization. Beam 56 bypasses the first polarization rotator 430 and the optical path compensator 420. The first polarization rotator 430 rotates beam 57 by 90° so that beams 56, 57 are complementarily polarized. The first birefringent element 410 refracts beam 56 and recombines beam 56 with beam 57 to form an output signal beam $V_1'$. The output signal beam $V_1'$ is collected at a second I/O port 402, as shown in FIG. 10A.

For WDM signals $V_3$ entering the third I/O port 403, the first birefringent element 410 divides the signals $V_3$ into complementary polarized components 66, 67. The optical path compensator 420 compensates for the optical path difference between beam 66 and 67 as they pass through the first birefringent element 410. The first polarization rotator 430 rotates beam 67 by 90° so that beams 66, 67 are both z-axis polarized. Since the first non-reciprocal polarization rotator 441 does not alter polarization for z-axis polarized beams traveling along the +y direction, and since the second birefringent element 450 does not refract z-axis polarized beams, beams 66, 67 pass through these components substantially without refraction or polarization rotation. The third non-reciprocal polarization rotator 465 rotates the polarization of both beams 66, 67 by 90° to become x-axis polarized. The third birefringent element 470 refracts both beams 66, 67 parallel to the +x-axis. The retro-reflector 490 reflects beams 66, 67 back in the −y direction. The third birefringent element 470 shifts beams 66, 67 parallel to the −x-axis. Beams 66, 67 pass through the third non-reciprocal polarization rotator 465 without polarization rotation. The second birefringent element 450 shifts beams 66, 67 parallel to the +x-axis. The second half-wave plate 445 rotates beams 66, 67 by 90°. Beam 66 bypasses the first polarization rotator 430 and the optical path compensator 420. The first polarization rotator 430 converts beam 67 to x-axis polarization so that beams 66, 67 are complementarily polarized. The first birefringent element 410 refracts z-axis polarized beam 66 and recombines beam 66 with beam 67 to form output signal $V_3'$, which exits the circulator 399 at the fourth I/O port 404.

For WDM signals $V_2$ originating from the second I/O port 402, the first birefringent element 410 divides the signals $V_2$ into complementary polarized components 76, 77. The optical path compensator 420 compensates for the optical path difference between beams 76 and 77 as they pass through the first birefringent element 410. The first polarization rotator 430 rotates beam 77 by 90° so that beams 76, 77 are both z-axis polarized. Since the first and second non-reciprocal polarization rotators 441, 461 do not alter polarization for z-axis polarized beams traveling along the +y direction, and since the second and third birefringent elements 450, 470 do not refract z-axis polarized beams, beams 76, 77 pass through these components substantially without refraction or polarization rotation. The retro-reflector 490 reflects beams 76, 77 back in the −y direction without polarization rotation. Both beams pass back through the third birefringent element 470 without refraction. The second non-reciprocal polarization rotator 461 rotates the polarization of both beams 76, 77 by 90° to become x-axis polarized. The second birefringent element 450 shifts both beams 66, 67 parallel to the +x-axis. The first non-reciprocal polarization rotator 441 rotates beams 76, 77 by 90° so that they are z-axis polarized. Beam 76 bypasses the first polarization rotator 430 and the optical path compensator 420. The first polarization rotator 430 converts beam 77 to x-axis polarization so that beams 76, 77 are complementarily polarized. The first birefringent element 410 refracts z-axis polarized beam 76 and recombines beam 76 with beam 77 to form output signal $V_2'$, which exits the circulator 399 at the third I/O port 403.

For WDM signals $V_4$ originating from the second I/O port 404, the first birefringent element 410 divides the signals $V_4$ into complementary polarized components 86, 87. The optical path compensator 420 compensates for the optical path difference between beams 86 and 87 due to the first birefringent element 410. The first polarization rotator 430 rotates beam 87 by 90° so that beams 86, 87 are both z-axis polarized. Both beams pass through the second half-wave plate 445 and are converted from z-axis polarization to x-axis polarization. The second birefringent element 450 shifts the x-axis polarized beams 86, 87 parallel to the −x-axis. The third non-reciprocal rotator 465 converts the beams 86, 87 from x-axis polarization to z-axis polarization. Thus, beams 86, 87 pass through the third birefringent element 470 from left to right substantially without refraction. The quarter-wave plate 480 has the fast- and slow-axis aligned such that it converts z-polarized beams 86, 87 to circulator polarization. Upon reflection from the retro-reflector 490, beams 86, 97 are still circularly polarized but with the opposite handedness. As a result, quarter-wave plate 480 converts the reflected beams 86, 87 to x-axis polarization. Both beams pass back through the third birefringent element 470 and are shifted parallel to the −x-direction as they travel though the third birefringent element from right to left. The second non-reciprocal polarization rotator 461 rotates the polarization of both beams 86, 87 by 90° so that they are both z-axis polarized. The z-axis polarized beams 86, 87 pass substantially un-refracted through second birefringent element 450. Both beams 86, 87 bypass the first non-reciprocal polarization rotator 441. Beam 86 bypasses the first polarization rotator 430 and the optical path compensator 420. The first polarization rotator 430 converts beam 87 from z-axis polarization to x-axis polarization so that beams 86, 87 are complementarily polarized as they enter the first birefringent element 410. The first birefringent element 410 refracts z-axis polarized beam 86 and recombines beam 86 with beam 87 to form output signal $V_4'$, which exits the circulator 399 at the first I/O port 404.

Figure 11:
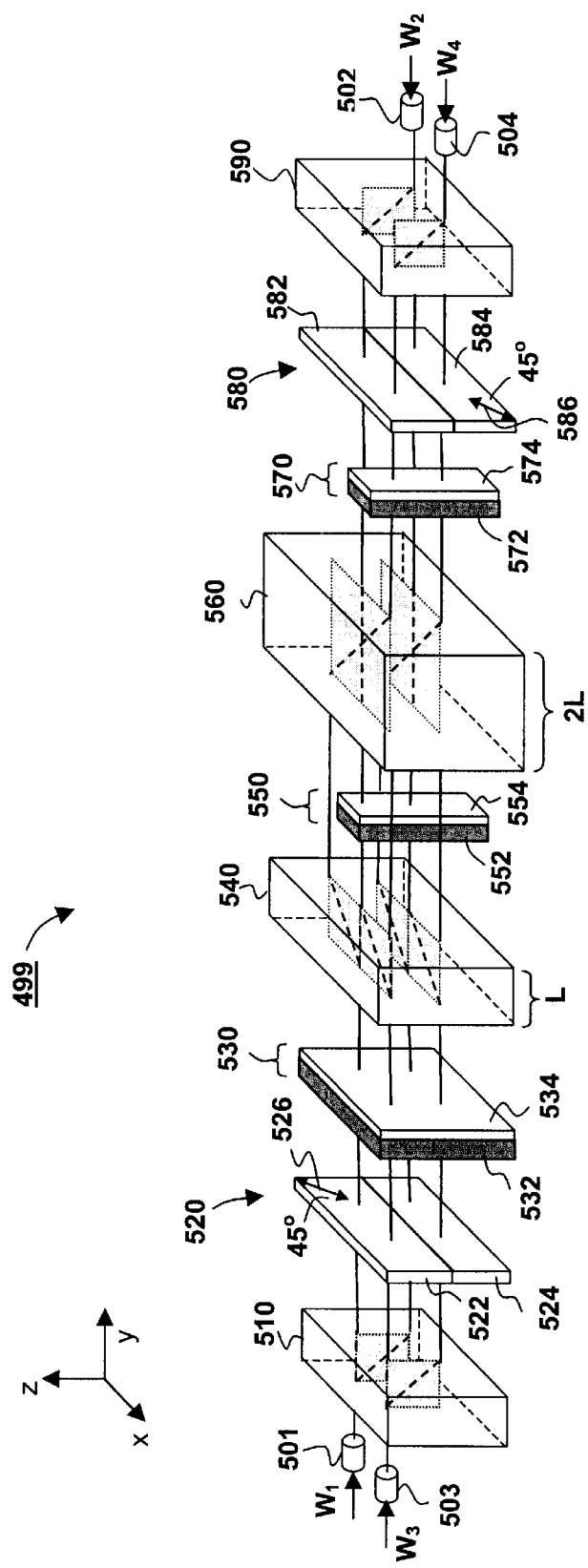
FIG. 11 depicts an isometric schematic diagram of an optical circulator according to a fifth embodiment of the invention.

FIG. 11 illustrates a four-port circulator 499 according to a fifth embodiment of the present invention, which is the preferred embodiment. The circulator 499 has features in common with the circulator 299 of FIG. 6. The circulator 499 utilizes fewer components than the circulator 299 while achieving substantially the same degree of isolation between the four input/output (I/O) ports 501, 502, 503, and 504. In the example depicted in FIG. 11, the first and second I/O ports 501, 502 are substantially aligned with each other and the third and fourth I/O ports 503, 504 are substantially aligned with each other. The I/O ports 501, 502, 503, 504 may each include a collimating lens, such as a graded refractive index (GRIN) lens, ball lens, or micro lens to couple optical signals between the circulator 499 and one or more optical fibers (not shown). Dual fiber collimators may also be used in the I/O ports as described above. The circulator 499 generally comprises first, second, third, and fourth birefringent elements 510, 540, 560, and 590, first and second polarization rotators 520, 580, and first, second, and third non-reciprocal polarization rotator (NPR) 530, 550, and 570. These elements are typically arranged in the order depicted in FIG. 11. The first and fourth birefringent elements 510, 590 are substantially identical in thickness and optic axis orientation, which is parallel to the y-z plane, such that the optical path difference incurred between the two complementarily polarized components traveling inside the birefringent elements 510, 590 tends to cancel out. The optical axes of the second and third birefringent element 540, 560 are substantially parallel to the x-y plane. The third birefringent element 560 may have a thickness 2L that is twice as long as the thickness L of the second birefringent element 540. The polarization rotators 520, 580 are each split into two segments. The two-segment rotators 520, 580 are easier to align and package than four segment polarization rotators. The polarization rotators 520, 580 may each include reciprocal rotating segments 522, 584, and optical path compensators 524, 582, respectively. The rotating segments 522, 582 may comprise reciprocal rotators, such as half-wave plates with optic axes 526, 586 oriented at 45° with respect to x-axis. Other types of reciprocal rotators, such as liquid crystals, and optically active crystals such as Quartz, $TeO_2$, Te, Se, and $AgGaS_2$ may also be used as rotating segments. Each of the three non-reciprocal polarization rotators 530, 550, and 570 may include Faraday rotator plates 532, 552, 572, and reciprocal rotating plate such as half-wave plates 534, 554, 574, respectively. The transmission characteristics of NPRs are previously described and shown in FIG. 2B and FIG. 2C. For either x-axis or z-axis polarized beam, if the beam travels from half-wave plate to Faraday rotator, the polarization is rotated by 90°; if the beam travels from Faraday rotator to half-wave plate, the polarization is un-changed. Again the relative positions of the Faraday rotator plates and half-waveplates may be switched as described in FIGS. 2B–2C. In the example shown in FIG. 11 the second and third NPRs 550, 570 are offset with respect to each other along the x-axis. Due to the offset, optical signals that travel without deviation from a path in line with the first and second I/O ports 501, 502 pass through the second NPR 550 and bypass the third NPR 570. Similarly, optical signals that travel without deviation from a path in line with the third and fourth I/O ports 503, 504 bypass the second NPR 550 and pass through the third NPR 570.

Figure 12A:
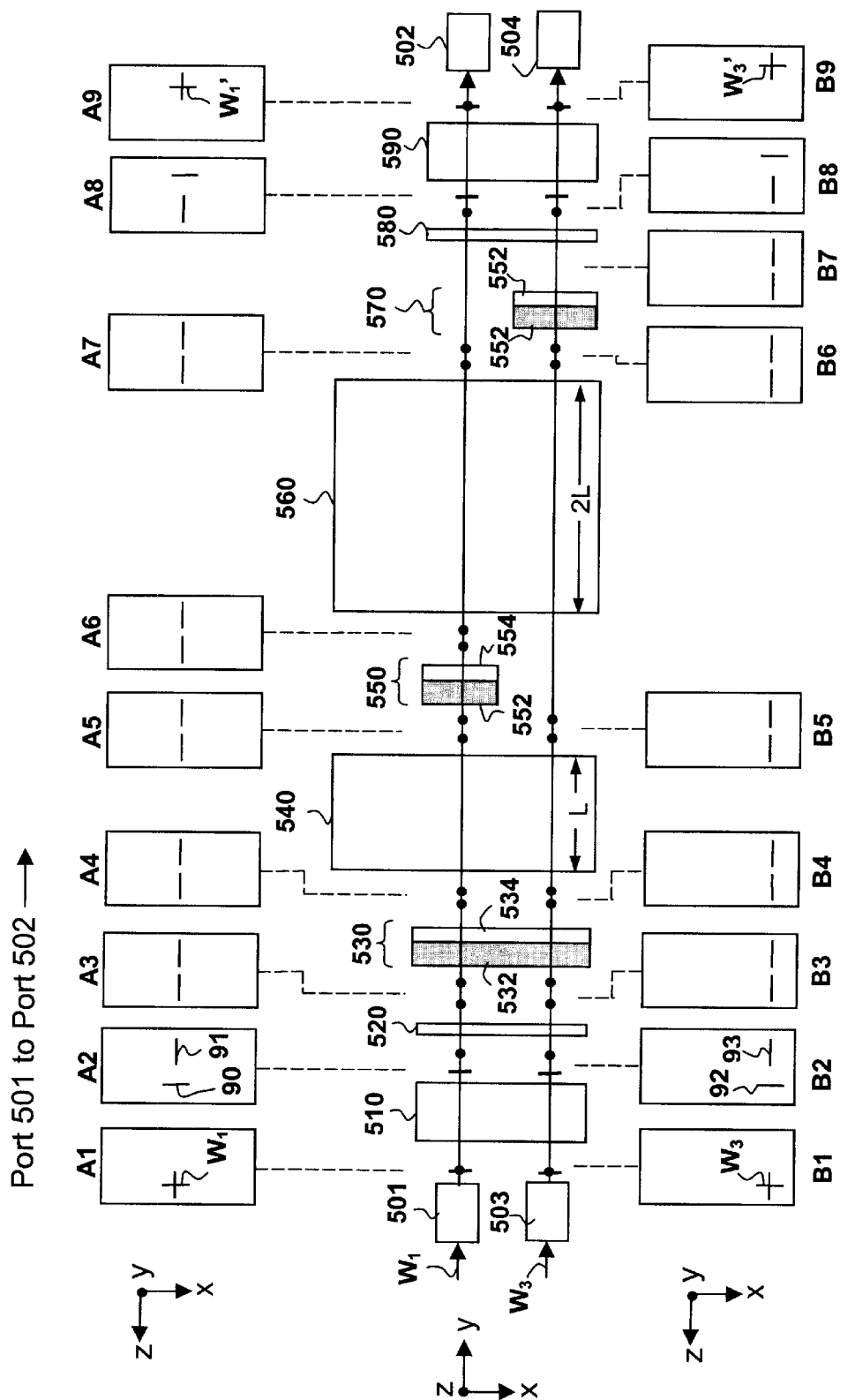
FIGS. 12A–12B depict cross-sectional schematic diagrams of optical signals at different locations within the optical circulator of FIG. 11.
Figure 12B:
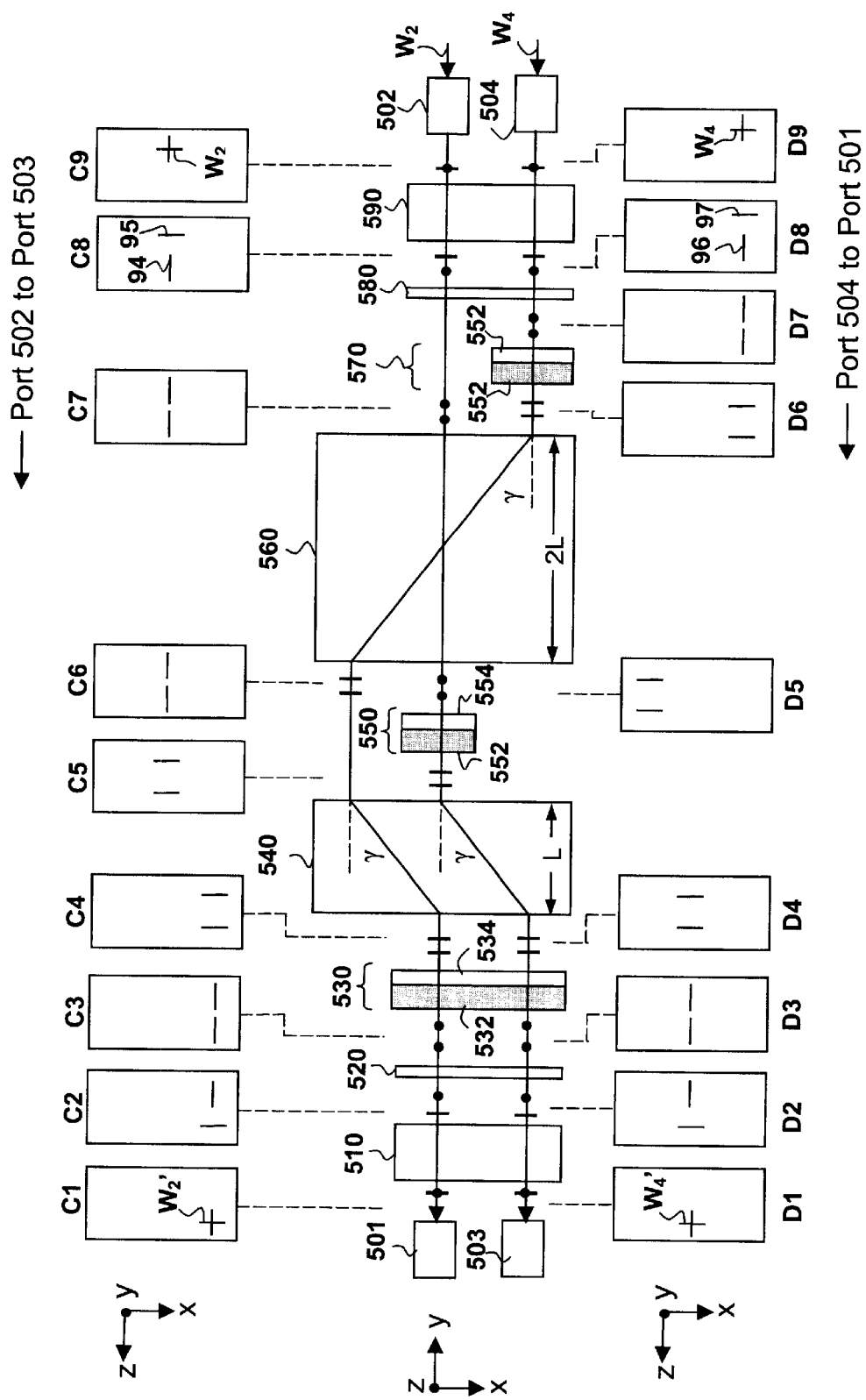

The method of operation of the four-port bi-directional circulator 499 can be understood by referring to FIGS. 12A and 12B which shows a cross-sectional view of the circulator 499 components as laid out in FIG. 11 looking along the z-axis. Polarization diagrams are shown at selected locations along the optical path. By way of example, one or more un-polarized WDM signals $W_1$ may enter the first birefringent element 510 from the first I/O port 501. The un-polarized signal $W_1$ may include both z-axis polarized (vertical) and x-axis polarized (horizontal) components as shown in cross section A1 of FIG. 12A. The first birefringent element 510 divides signal $W_1$ into a horizontally polarized ordinary component 90 and vertically polarized extraordinary component 91. The extraordinary component 91 is refracted by the first birefringent element 510 and spatially separated from the ordinary beam 90 as shown in cross section A2 of FIG. 12A. The first polarization rotator 520 is optically coupled between the first birefringent element 510 and the first NPR 530. The polarization of beam 90 is rotated by 90° after traveling through a first half-wave plate section 522 in the first polarization rotator 520, while the polarization of beam 91 is unchanged after traveling through a first optical-path compensation section 524 in the first polarization rotator 520. The optical path in section 524 is equal to the optical path in section 522. As a result, both beams 90, 91 are phase-matched and z-axis polarized as shown in cross section A3 of FIG. 12A.

The first NPR 530 is optically coupled between the first polarization rotator 520 and the second birefringent element 540. The NPR 530 does not change the polarization of beams 90, 91 as shown in cross section A4 of FIG. 12A. Beams 90, 91 consecutively pass through the second birefringent element 540, the second NPR 550, and the third birefringent element 560 with their original polarization and propagation directions, as shown in cross section A5, A6, and A7 of FIG. 12A. Both beams 90, 91 bypass the third NPR 570 and enter the second polarization rotator 580. The second polarization rotator 580 includes a second optical path compensator 582 and a second half-wave plate section 584 as shown in FIG. 11. Beam 91 passes through the half-wave plate section 584, which rotates the polarization of beam 91 by 90°. Beam 90 passes through optical-path compensator 582 without changing its polarization. Consequently beams 90, 91 are complementarily polarized and phase-matched, as shown in cross section A8 of FIG. 12A. The fourth birefringent element 590 refracts beam 90 and combines beam 90 with beam 91 to form output signals $W_1'$, as shown in cross section A9 of FIG. 12A. The output signal beam $W_1'$ exits the circulator 499 at a second I/O port 502.

For WDM signals $W_3$ entering the third I/O port 503, the first birefringent element 510 divides the signals into complementary polarized components 92, 93 as shown in cross section B2 of FIG. 12A. The half-wave plate section 522 in the first polarization rotator 510 rotates beam 92 by 90°, while the optical path compensator section 524 compensates for optical path that beam 92 takes through section 522. Consequently beams 92, 93 are both vertically polarized and phase-matched, as shown in cross section B3 of FIG. 12A. Beams 92, 93 pass through the first NPR 530, the second and third birefringent elements 540, 560, (bypassing the second NPR 550) and the third NPR 570 in sequence without altering the polarization and propagation direction, as shown in cross section B5, B6, and B7 of FIG. 12A. The half-wave plate section 584 in the second polarization rotator 580 rotates beam 93 by 90°, while the optical path compensator section 582 compensates for optical path that beam 93 takes through the half-wave plate section 584 without rotating the polarization of beam 92. As a result, beams 92, 93 are complementary polarized and phase-matched, as shown in cross section B8 of FIG. 12A. The fourth birefringent element 590 refracts vertically polarized beam 92 and recombines beam 92 with beam 93 to form output signal $W_3'$ that exits to the fourth I/O port 504, as shown in cross section B9 of FIG. 12A.

Referring now to FIG. 12B. For WDM signals $W_2$ entering the second I/O port 502, the fourth birefringent element 590 divides the signals into complementary polarized components 94, 95 as shown in cross section C8 of FIG. 12B. The half-wave plate section 584 in the second polarization rotator 580 rotates beam 95 by 90° while the optical path compensator section 582 compensates for optical path that beam 95 takes through section 584. Thus beams 94, 95 are both x-axis polarized and phase-matched, as shown in cross section C7 of FIG. 12B. Beams 94, 95 bypass the third NPR 570 and continue to travel through the third birefringent element 560 without refraction, as shown in cross section C6 of FIG. 12B. The second NPR 550 rotates both beams 94, 95 by 90° to become x-axis polarized, as shown in cross section C5 of FIG. 12B. The second birefringent element 540 refracts both beams 94, 95 at an angle γ so that both beams are displaced at a distance L·tan(γ) along the x-direction, as shown in cross section C4 of FIG. 12B. The first NPR 530 transforms both horizontally polarized beams 94, 95 into vertical polarization, as shown in cross-section C3 of FIG. 12B. The half-wave plate section 522 in the first polarization rotator 520 rotates beam 94 by 90°, while the optical path compensator section 524 compensates for optical path that beam 94 takes through section 522. As a result, beams 94, 95 are complementarily polarized and phase-matched, as shown in cross section C2 of FIG. 12B. The first birefringent element 510 refracts vertically polarized beam 95 and recombines beam 95 with beam 94 to form output signals $W_2'$ exiting at the third I/O port 503, as shown in cross section C1 of FIG. 12B.

For WDM signals $W_4$ entering the fourth I/O port 504, the fourth birefringent element 590 divides the signals into complementary polarized components 96, 97 as shown in cross section D8 of FIG. 12B. The half-wave plate section 584 in the second polarization rotator 580 rotates beam 97 by 90° while the optical path compensator section 582 compensates for optical path that beam 97 travels through section 584. Thus beams 96, 97 are both vertically polarized and phase-matched, as shown in cross section D7 of FIG. 12B. The third non-reciprocal polarization rotator 570 rotates both beams 96, 97 by 90°, as shown in cross section D6 of FIG. 12B. The third birefringent element 560 refracts both vertically polarized beams 96, 97 upward at an angle γ so that both beams are displaced along −x-direction by a distance 2L·tan(γ) at the exit of element 560, as shown in cross section D5 of FIG. 12B. Both beams 96, 97 bypass the second NPR 550 and enter the second birefringent element with horizontal (x-axis) polarization. The second birefringent element 540 refracts beams 96, 97 at an angle γ such that both beams are displaced along +x-direction by a distance L·tan(γ) at the exit of element 540, as shown in cross section D4 of FIG. 12B. The second NPR 530 rotates both beams 96, 97 from vertical polarization to horizontal polarization, as shown in cross section D3 of FIG. 12B. The half-wave plate section 522 in the first polarization rotator 520 rotates beam 96 by 90°, while the optical path compensator section 524 compensates for optical path that beam 96 takes through section 522. As a result, beams 96, 97 are complementarily polarized and phase-matched, as shown in cross section D2 of FIG. 12B. The first birefringent element 510 refracts z-axis polarized beam 97 and recombines beam 97 with beam 96 to form output signal $W_4'$ that exits at the first I/O port 501, as shown in cross section D1 of FIG. 12B.

Figure 13:
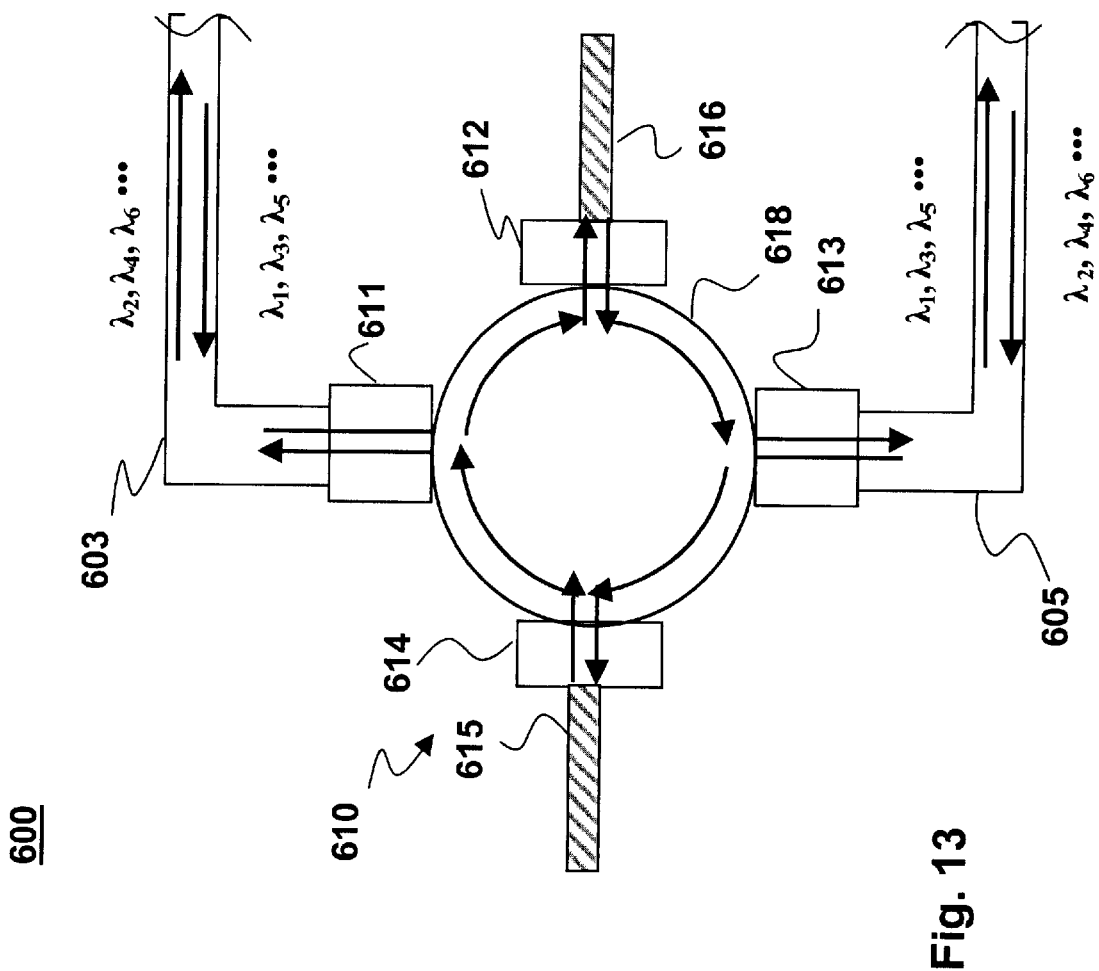
FIG. 13 depicts a schematic diagram of an optical apparatus according to a sixth embodiment of the present invention.

The circulators shown in FIGS. 2A–12B may be incorporated into an apparatus that can be used for dispersion compensation, optical add/drop, and wavelength conversion in bi-directional optical communications systems. An example of such an apparatus 600 is depicted schematically in FIG. 13. The apparatus 600 generally includes a multi-port branching device 610 having four input output (I/O) ports 611, 612, 613, 614 coupled to a 4-port bi-directional optical circulator 618. The circulator 618 may have features in common with the optical circulators described with respect to FIGS. 2A–12B. Optical signals entering port 611 are directed to port 612. Optical signals entering port 612 are directed to port 613. Optical signals entering port 613 are directed to port 614. Optical signals entering ports 614 are directed to port 611. By way of example port 611 and port 613 may be coupled to optical fibers 603, 605. Ports 612 and ports 614 may be respectively connected to optical signal conditioners 615, 616. By way of example optical signals characterized by odd wavelengths $\lambda_1, \lambda_3, \lambda_5 \ldots$ may arrive from the fiber 603 at the circulator 618 at port 611. The circulator 618 routes the signals from port 611 to port 612 for optical signal conditioning by signal conditioner 616. The optical signal conditioner 616 returns conditioned signals to port 612. From port 612 the optical signals are routed to port 613, where they are coupled to the fiber 605. Optical signals characterized by even wavelengths $\lambda_2, \lambda_4, \lambda_6 \ldots$ may arrive from the fiber 605 at the circulator 618 at port 613. The circulator 618 routes the signals from port 613 to port 614 for signal conditioning by signal conditioner 615. The signal conditioner 615 returns conditioned signals to port 614. From port 614 the conditioned optical signals are routed to port 611, where they are coupled to the fiber 603. The optical signal conditioners 615, 616 may be chirped fiber gratings to achieve passive bi-directional dispersion compensation. Alternatively, the optical signal conditioners 615, 616 may be wavelength converters for wavelength conversion applications, such as one or more switching channels to different wavelengths. Alternatively, the optical signal conditioners 615, 616 may be dynamic dispersion compensators or retiming elements for time division multiplexing (TDM).

Figure 14:
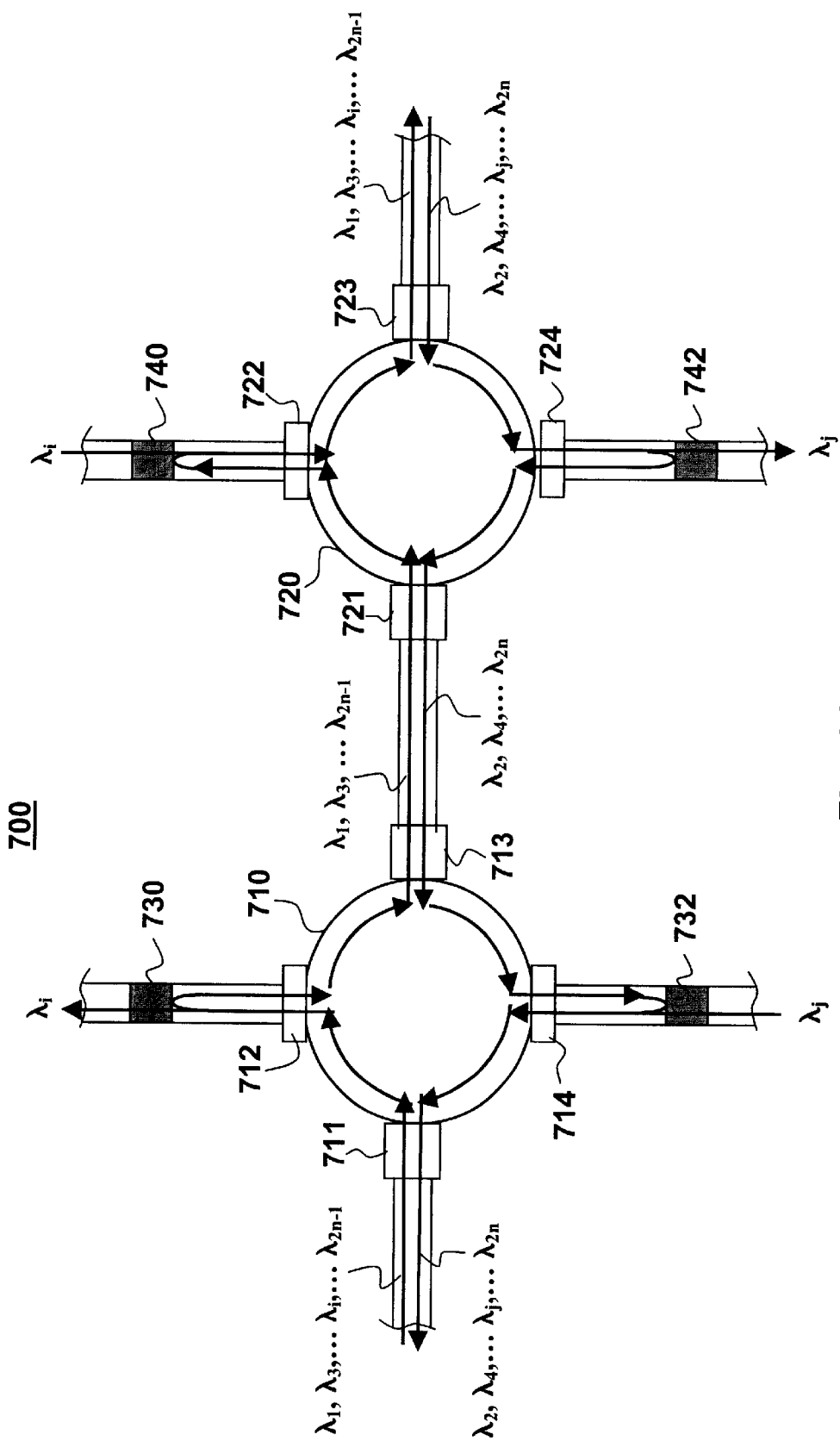
FIG. 14 depicts a schematic diagram of a bidirectional optical add/drop apparatus according to a seventh embodiment of the present invention.

FIG. 14 depicts an example of an apparatus 700 for implementing a bi-directional optical add/drop function. The apparatus 700 generally comprises a first bi-directional circulator 710 optically coupled to a second bidirectional circulator 720. The circulators 710 and 720 may have features in common with the optical circulators 99, 199, 299, 399 and 499 previously described. The first circulator 710 has four input/output ports 711, 712, 713, 714. Similarly the second circulator 720 has four input/output ports 721, 722, 723, 724. Signal traffic is coupled in and out of add/drop module 700 through port 711 in the first circulator 710 and port 723 in the second circulator 723. Port 712, 714 in the first circulator 710 and port 722, 724 in the second circulator 720 are optically coupled to first, second, third, and fourth channel band-pass filters 730, 732, 740, 742, respectively. The band-pass filters 730, 732, 740, 742 may be wavelength division multiplexing (WDM) filters, e.g., made with multi-dielectric layer coatings. Alternatively, the band pass filters 730, 732, 740, 742 may be made by cascading band-stop fiber Bragg gratings. In FIG. 14, the first and third channel band-pass filters 730, 740 are characterized with high transmission for signals at wavelength $\lambda_i$ and high reflectivity for signals at other wavelengths. The second and fourth channel band-pass filters 732, 742 are characterized with high transmission for signals at wavelength $\lambda_j$ and high reflectivity for signals at other wavelengths. By way of example, in the east-bound signal traffic, the odd-channel signals $\lambda_1, \lambda_3, \ldots \lambda_i \ldots \lambda_{2n-1}$ entering port 711 are directed to port 71 Signal $\lambda_i$ passes through the first channel band-pass filter 730 and drops off from the signal traffic, whereas the other signals $\lambda_1, \lambda_3, \ldots \lambda_{2n-1}$ are blocked by the first channel band-pass filter 730 and return back to the first circulator 710 at port 712. These signals are directed to the third input/output port 713 in the first circulator 710. The third input/output port 713 in the first circulator 710 is optically coupled to the first input/output port 721 in the second circulator 720. The signals $\lambda_1, \lambda_3, \ldots \lambda_{2n-1}$ entering the first input/output port 721 are directed to the second input/output port 722 in the second circulator 720. The third band-pass filter 740 at the output of port 722 reflects signals $\lambda_1, \lambda_3, \ldots X_{2n-1}$ back to the second circulator 720. In the meantime, the third band-pass filter may transmit an ADD signal at wavelength $\lambda_i$ through the second input/output port 622 in the second circulator 720. The signals that cover the entire transmission band $\lambda_1, \lambda_3, \ldots \lambda_i \ldots \lambda_{2n-1}$ are then redirected to the east-bound signal traffic through the third input/output port 723 in the second circulator 720.

Similarly, in the west-bound signal traffic, the even-channel signals $\lambda_2, \lambda_4, \ldots \lambda_j \ldots \lambda_{2n}$ entering the third input/output port 723 are directed to the fourth input/output port 724 in the second circulator 720. The DROP signal $\lambda_j$ passes through the fourth channel band-pass filter 742 and drops off from the signal traffic, whereas the other signals $\lambda_2, \lambda_4, \ldots \lambda_{2n}$ are blocked by the fourth channel band-pass filter 742 and return back to the second circulator 710 at port 724. These signals are directed to the first input/output port 721 in the second circulator 720 and exit the second circulator 720. The signals $\lambda_2, \lambda_4, \ldots \lambda_{2n}$ then enter the third input/output port 713 in the first circulator 710 and travel to the fourth input/output port 714. The second band-pass filter 732 at the output of port 714 reflects signals $\lambda_2, \lambda_4, \ldots \lambda_{2n}$ back to the first circulator 710. An ADD signal at wavelength $\lambda_j$ may be transmitted through the fourth input/output port 714 in the first circulator 710. Therefore the signals that cover the entire transmission band $\lambda_2, \lambda_4, \ldots \lambda_j \ldots \lambda_{2n}$ are redirected to the west-bound signal traffic through the first input/output port 711 in the first circulator 710.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A four-port optical circulator, comprising:
    at least first, second, third and fourth optical input/output ports;
    first and second birefringent elements;
    a first polarization rotator optically coupled between the first and second birefringent elements, the first polarization rotator having one or more reciprocal polarization rotation sections and one or more optical path compensation sections; a non-reciprocal polarization rotator;
    a third birefringent element optically coupled to the non-reciprocal polarization rotator;
    a second polarization rotator optically coupled to the third birefringent element, the second polarization rotator having first and second half-wave plate sections and first and second optical path compensation sections; and
    a fourth birefringent element optically coupled to the second polarization rotator wherein the second birefringent element is disposed between the first polarization rotator and the non-reciprocal polarization rotator;

wherein the circulator routes optical signals from the first port to the second port;

wherein the circulator routes optical signals from the second port to the third port;

wherein the circulator routes optical signals from the third port to the fourth port;

wherein the circulator routes optical signals from the fourth port to the first port.

2. The circulator of claim 1 wherein the first and third ports are optically coupled to the first birefringent element and the second and fourth ports are optically coupled to the fourth birefringent element.

3. A four-port optical circulator, comprising: at least first, second, third, and fourth optical input/output ports, first and second birefringent elements; a first polarization rotator optically coupled between the first and second birefringent elements, the first polarization rotator having one or more reciprocal polarization rotation sections and one or more optical path compensation sections; and a non-reciprocal polarization rotator; wherein the second birefringent element is disposed between the first polarization rotator and the non-reciprocal polarization rotator; wherein the second birefringent element is disposed between the first polarization rotator and the non-reciprocal polarization rotator; a retroreflector; wherein the non-reciprocal polarization rotator is disposed between the retroreflector and the second birefringent element; wherein the circulator routes optical signals from the first port to the second port; wherein the circulator routes optical signals from the second port to the third port; wherein the circulator routes optical signals from the third port to the fourth port; wherein the circulator routes optical signals from the fourth port to the first port.

4. The circulator of claim 3 wherein the retro-reflector is a prism.

5. The circulator of claim 3 wherein the retro-reflector is a plane reflector.

6. The circulator of claim 3 further comprising a third birefringent element disposed between the second birefringent element and the retro-reflector.

7. The circulator of claim 6 further comprising an additional polarization rotator disposed between the third birefringent element and the retro-reflector, wherein the additional polarization rotator and the retro-reflector cooperate to switch the polarization of optical signals between complementary states upon reflection from the retro-reflector.

8. The circulator of claim 7, wherein the additional polarization rotator is a quarter-wave plate having fast and slow axes configured to change linearly polarized light to circularly polarized light and vice versa.

9. The circulator of claim 3 wherein the polarization rotator is configured to allow selected optical signals to bypass the polarization rotator.

10. The circulator of claim 3 further comprising an optical path compensator disposed between the first birefringent element and the retroreflector.

11. The circulator of claim 10 wherein the optical path compensator is configured to allow selected optical signals to bypass the optical path compensator.

12. A four-port optical circulator, comprising:
at least first, second, third, and fourth input/output (I/O) ports;
at least a first, second and third, birefringent element;
at least a first polarization rotator optically coupled between the first and second birefringent elements, the first polarization rotator having one or more reciprocal polarization rotation sections and one or more optical path compensation sections; and
at least a first, second, and third non-reciprocal polarization rotator,
wherein the first non-reciprocal polarization rotator is disposed between the first polarization rotator and the second birefringent element;
wherein the second birefringent element is disposed between the non-reciprocal polarization rotator and the second non-reciprocal polarization rotator;
wherein the second non-reciprocal polarization rotator is disposed between the second and third birefringent elements;
wherein the third birefringent element is disposed between the second and third non-reciprocal polarization rotators;
wherein the circulator routes optical signals from the first I/O port to the second I/O port;
wherein the circulator routes optical signals from the second I/O port to the third I/O port;
wherein the circulator routes optical signals from the third I/O port to the fourth I/O port; and
wherein the circulator routes optical signals from the fourth I/O port to the first I/O port.

13. The circulator of claim 12, further comprising a second polarization rotator, wherein the third non-reciprocal polarization rotator is disposed between the third birefringent element and the second polarization rotator.

14. The circulator of claim 13, wherein the second polarization rotator includes one or more half-wave plate sections and one or more optical path compensation sections.

15. The circulator of claim 13, further comprising a fourth birefringent element, wherein the second polarization rotator is disposed between the third non-reciprocal polarization rotator and the fourth birefringent element.

16. The circulator of claim 15, wherein the first and third I/O ports are optically coupled to the first birefringent element; and
wherein the second and fourth I/O ports are optically coupled to the fourth birefringent element.

17. The circulator of claim 12, wherein the second non-reciprocal polarization rotator is configured to allow selected optical signals to bypass the second non-reciprocal polarization rotator.

18. The circulator of claim 17, wherein the third non-reciprocal polarization rotator is configured to allow selected optical signals to bypass the third non-reciprocal polarization rotator.

19. The circulator of claim 17, further comprising:
a fourth birefringent element,
wherein the third non-reciprocal polarization rotator is disposed between the third birefringent element and the fourth birefringent element.

20. The circulator of claim 19, wherein the second non-reciprocal polarization rotator is configured to allow selected optical signals to bypass the second non-reciprocal polarization rotator.

21. The circulator of claim 20, further comprising:
a fourth non-reciprocal polarization rotator,
wherein the fourth birefringent element is disposed between the third and fourth non-reciprocal polarization rotators.

22. The circulator of claim 21, further comprising:
second polarization rotator, wherein the fourth non-reciprocal polarization rotator is disposed between the second polarization rotator and the fourth birefringent element.

23. The circulator of claim 22, wherein one or more of the first and second polarization rotators includes first and second polarization rotation sections and first and second optical path compensation sections.

24. The circulator of claim 22, further comprising a fifth birefringent element,
wherein the second polarization rotator is disposed between the fourth non-reciprocal polarization rotator and the fifth birefringent element.

25. The circulator of claim 24, wherein the third non-reciprocal polarization rotator is configured to allow selected optical signals to bypass the third non-reciprocal polarization rotator.

26. The circulator of claim 24, wherein the first and third I/O ports are optically coupled to the first birefringent element; and
wherein the second and fourth I/O ports are optically coupled to the fifth birefringent element.

27. The circulator of claim 12, wherein one or more of the first, second third and fourth I/O ports includes a dual fiber collimator.

28. A bi-directional optical add/drop apparatus, comprising:
a first bi-directional circulator having first, second, third, and fourth input/out (I/O) ports;
wherein the optical circulator routes optical signals from the second I/O port to the third I/O port;
wherein the optical circulator routes optical signals from the third I/O port to the fourth I/O port;
wherein the optical circulator routes optical signals from the fourth I/O port to the first I/O port.
a first bandpass filter optically coupled to the second I/O port; and
second bandpass filter optically coupled to the fourth I/O port
wherein one or more of the first and second bandpass filters includes a filter selected from the group consisting of multi-dielectric layer coatings and cascaded band-stop fiber Bragg gratings.

29. A bi-directional optical add/drop apparatus, comprising:
a first bi-directional circulator having first, second, third, and fourth input/output (I/O) ports;
wherein the optical circulator routes optical signals from the second I/O port to the third I/O port;
wherein the optical circulator routes optical signals from the third I/O port to the fourth I/O port;
wherein the optical circulator routes optical signals from the fourth I/O port to the first I/O port,
a first bandpass filter optically coupled to the second I/O port;
a second bandpass filter optically coupled to the fourth I/O port;
a second bi-directional circulator having first, second, third, and fourth input/output (I/O) ports;
a third bandpass filter optically coupled to the second I/O port of the second bi-directional circulator; and
a fourth bandpass filter optically coupled to the fourth I/O port of the second bi-directional circulator;
wherein the third I/O port of the first bi-directional circulator is optically coupled to the first I/O port of the second bi-directional circulator.

* * * * *